United States Patent
Yoshizawa et al.

(10) Patent No.: US 8,437,910 B2
(45) Date of Patent: May 7, 2013

(54) AUTOMOTIVE ELECTRIC POWER SUPPLY SYSTEM

(75) Inventors: Toshiyuki Yoshizawa, Tokyo (JP); Masaya Inoue, Tokyo (JP); Takahiro Urakabe, Tokyo (JP); Tatsuya Okuda, Tokyo (JP); Yuuya Tanaka, Tokyo (JP); Takayoshi Nagai, Tokyo (JP); Shigeki Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/390,757

(22) PCT Filed: Oct. 13, 2010

(86) PCT No.: PCT/JP2010/067970
§ 371 (c)(1),
(2), (4) Date: Feb. 16, 2012

(87) PCT Pub. No.: WO2011/046147
PCT Pub. Date: Apr. 21, 2011

(65) Prior Publication Data
US 2012/0158245 A1 Jun. 21, 2012

(30) Foreign Application Priority Data
Oct. 16, 2009 (JP) .................. 2009-239380
Jan. 14, 2010 (JP) .................. 2010-006180

(51) Int. Cl.
*G06F 7/00* (2006.01)
(52) U.S. Cl. ............. 701/36; 701/490; 700/22; 700/297
(58) Field of Classification Search ............. 701/36, 701/490; 700/22, 297
See application file for complete search history.

(56) References Cited

U.S. PATENT DOCUMENTS

| 6,353,310 | B1 * | 3/2002 | Wang ............................. 323/285 |
| 6,903,950 | B2 * | 6/2005 | Afzal et al. ................... 363/142 |
| 7,109,605 | B2 * | 9/2006 | Habu .............................. 307/39 |
| 2003/0057916 | A1 * | 3/2003 | Davis et al. ................... 318/800 |
| 2003/0080623 | A1 * | 5/2003 | MacDonald et al. ........... 307/72 |
| 2010/0220501 | A1 * | 9/2010 | Krause ............................. 363/17 |

FOREIGN PATENT DOCUMENTS

| JP | 55 23869 | 2/1980 |
| JP | 62 185433 | 11/1987 |
| JP | 2000 270407 | 9/2000 |
| JP | 2005 073328 | 3/2005 |
| JP | 2006 87163 | 3/2006 |
| JP | 2006 304551 | 11/2006 |
| JP | 2008 67504 | 3/2008 |
| JP | 2009 148090 | 7/2009 |
| WO | 2004 109892 | 12/2004 |
| WO | 2010 007771 | 1/2010 |

OTHER PUBLICATIONS

International Search Report Issued Dec. 28, 2010 in PCT/JP10/67970 Filed Oct. 13, 2010.

* cited by examiner

*Primary Examiner* — Calvin Cheung
(74) *Attorney, Agent, or Firm* — Oblon, Spivak, McClelland, Maier & Neustadt, L.L.P.

(57) ABSTRACT

A first DC/DC converter is connected to a higher-voltage output terminal of a rectifier by alternator wiring, a battery that supplies electric power to an on-board load is connected to the first DC/DC converter, a second DC/DC converter is connected to the higher-voltage output terminal of the rectifier by alternator wiring, and an electrical double-layer capacitor is connected to the second DC/DC converter.

18 Claims, 13 Drawing Sheets

AUTOMOTIVE ELECTRIC POWER SUPPLY SYSTEM

TECHNICAL FIELD

The present invention relates to an automotive electric power supply system and particularly relates to an automotive electric power supply system that can achieve regeneration of vehicle braking energy and improvements in vehicle fuel consumption.

BACKGROUND ART

Conventional automotive electric power source systems are configured such that generated voltage from an alternator that is driven by an engine and that supplies power to a battery is set higher during deceleration of a vehicle than during non-deceleration of the vehicle, regeneration of braking energy is performed actively during vehicle deceleration, and load on the engine is reduced during non-deceleration of the vehicle to achieve improvements in fuel consumption (see Patent Literature 1, for example).

CITATION LIST

Patent Literature

Patent Literature 1: Japanese Patent Laid-Open No. 2008-67504 (Gazette)

SUMMARY OF THE INVENTION

Problem to be Solved by the Invention

Because conventional automotive power supply systems are configured such that electric power that is generated by the alternator is supplied directly to the battery to charge the battery, service life of the battery may be shortened if the electric power that is generated by the alternator is changed significantly. As a result, one problem has been that battery charging rates cannot be increased significantly since margins for setting the electric power that is generated by the alternator higher cannot be increased.

The present invention aims to solve the above problems and an object of the present invention is to provide an automotive electric power supply system that suppresses deterioration in service life of a first electricity storage apparatus and enables electric power that is generated by an alternator to be changed significantly so as to enable increases in a charging rate of the first electricity storage apparatus, and enable regeneration of vehicle braking energy and improvements in vehicle fuel consumption to be achieved.

Means for Solving the Problem

In order to achieve the above object, according to one aspect of the present invention, there is provided an automotive electric power supply system characterized in including: an alternator that is driven by an engine to generate alternating-current electric power; a rectifier that rectifies the alternating-current electric power that is generated by the alternator to output direct-current electric power; a first DC/DC converter that is connected by means of alternator wiring to a higher-voltage output terminal of the rectifier, and that converts a voltage value of an output voltage of the rectifier to output a different direct-current voltage; a first electricity storage apparatus that is connected by means of load wiring to the first DC/DC converter, and that supplies electric power to a load; a second DC/DC converter that is connected by means of alternator wiring to a higher-voltage output terminal of the rectifier, and that converts a voltage value of an output voltage of the rectifier to output a different direct-current voltage; a second electricity storage apparatus that has an electricity storage capacity that is less than the first electricity storage apparatus, and that is connected to the second DC/DC converter; a regulator circuit that is connected to the alternator wiring or the load wiring, and that supplies a field current to a field winding of the alternator; and a controlling circuit that controls driving of the first DC/DC converter and the second DC/DC converter to store the generated electric power from the alternator in the first electricity storage apparatus and the second electricity storage apparatus.

Effects of the Invention

According to the present invention, because the first electricity storage apparatus is connected to the higher-voltage output terminal of the rectifier by means of the first DC/DC converter, the generated electric power from the alternator is not supplied directly to the first electricity storage apparatus. Thus, even if the generated electric power from the alternator is changed significantly, it does not lead to shortening of the service life of the first electricity storage apparatus. As a result, the margin of increase in the generated electric power from the alternator can be increased, enabling the charging rate of the first electricity storage apparatus and the second electricity storage apparatus to be increased significantly. Vehicle braking energy can thereby be recovered efficiently, reducing load on the engine during non-deceleration and enabling improvements in fuel consumption.

BEST MODE FOR CARRYING OUT THE INVENTION

Embodiment 1

Figure 1:
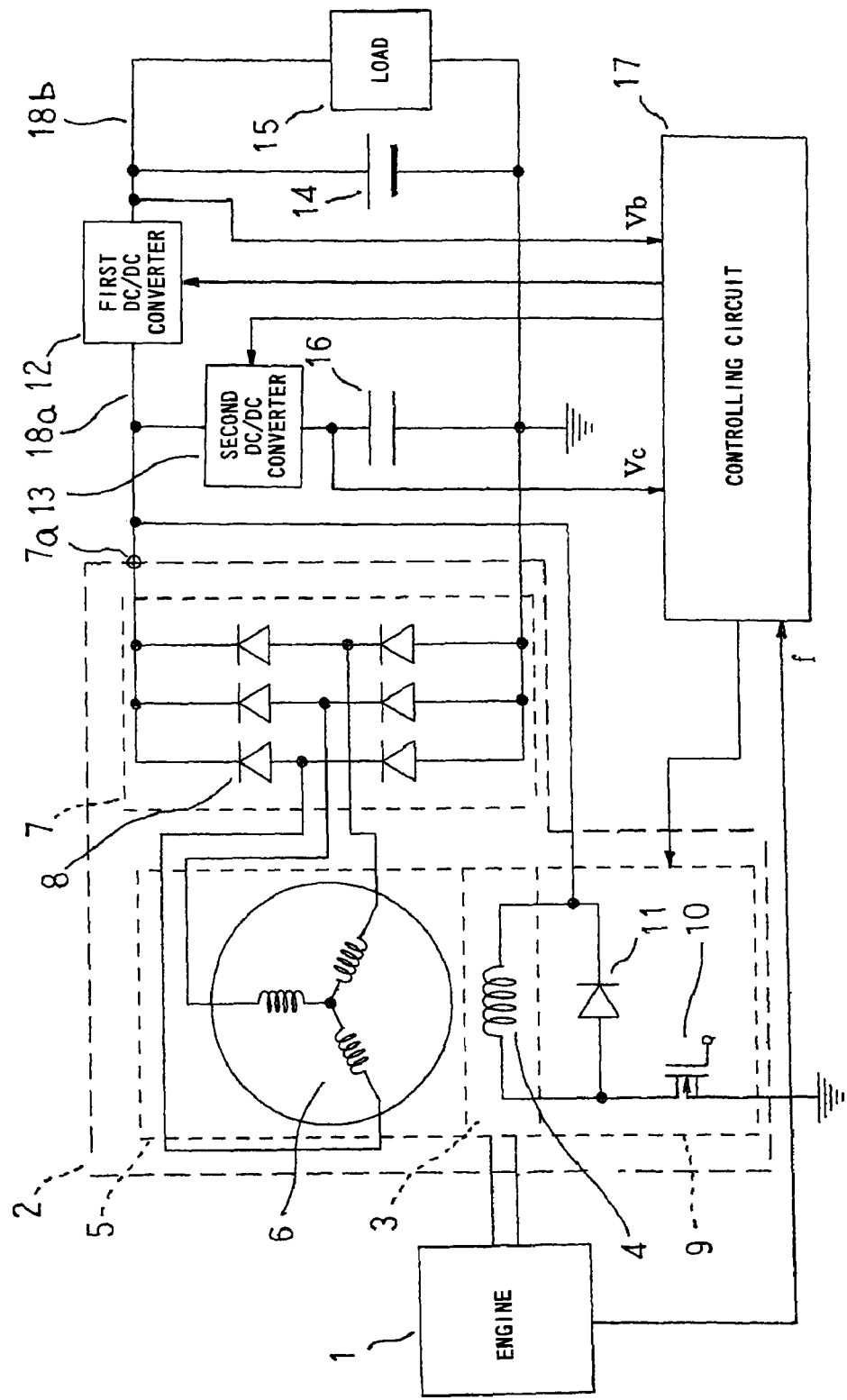
FIG. 1 is a circuit configuration diagram of an automotive electric power supply system according to Embodiment 1 of the present invention.

FIG. 1 is a circuit configuration diagram of an automotive electric power supply system according to Embodiment 1 of the present invention.

In FIG. 1, an automotive electric power supply system includes: an alternator 2 that is driven by an engine 1 to generate alternating-current (AC) electric power; a rectifier 7 that rectifies the AC power that is generated by the alternator 2 to output direct-current (DC) electric power; a first DC/DC converter 12 that converts the output voltage of the rectifier 7 to output a DC voltage that has a different voltage value; a second DC/DC converter 13 that converts the output voltage of the rectifier 7 to output a DC voltage that has a different voltage value; a battery 14 that functions as a first electricity storage apparatus that is charged by the DC power that is converted by the first DC/DC converter 12, and that supplies electric power to a load 15; an electrical double-layer capacitor 16 that functions as a second electricity storage apparatus that has a smaller electricity storage capacity than the battery 14, and that stores the DC power that is converted by the second DC/DC converter 13; a regulator circuit 9 that controls a rate of passage of current to a field winding 4 of the alternator 2; and a controlling circuit 17 that controls driving of the first and second DC/DC converters 12 and 13, and the regulator circuit 9, based on a rotational speed f of the engine 1, a terminal voltage Vc of the electrical double-layer capacitor 16, and a voltage Vb of load wiring 18b.

The alternator 2 is a Lundell alternator that includes: a claw-pole rotor 3 that has a field winding 4; a stator 5 that has a three-phase alternating-current winding 6; the rectifier 7; and the regulator circuit 9. Moreover, in this case, the rectifier 7 and the regulator circuit 9 are mounted internally into the alternator 2, but may also be configured as separate parts from the alternator 2.

The rectifier 7 is configured into a three-phase full-wave rectifying circuit that is constituted by a diode bridge circuit in which three diode pairs that are formed by connecting two diodes 8 in series are connected in parallel, and rectifies AC power that is induced in the three-phase alternating-current winding 6 into DC power.

The regulator circuit 9 is constituted by a metal oxide semiconductor field-effect transistor (MOSFET) 10 and a diode 11. A drain terminal of the MOSFET 10 is connected to an anode terminal of the diode 11, a source terminal is grounded, and a gate terminal is connected to the controlling circuit 17. A cathode terminal of the diode 11 is connected to alternator wiring 18a that connects a higher-voltage output terminal 7a of the rectifier 7 and an input voltage terminal of the first DC/DC converter 12. In addition, two ends of the field winding 4 are respectively connected to the cathode terminal of the diode 11, and to a connecting point between the anode terminal of the diode 11 and the drain terminal of the MOSFET 10.

The battery 14 is a secondary battery such as a lead-acid storage battery, a nickel-cadmium storage battery, etc., and constitutes a power source for a lower-voltage system of 14 V (rated voltage), for example. The battery 14 is connected to the load wiring 18b, which connects an output voltage terminal of the first DC/DC converter 12 and the load 15. The load 15 is electrical equipment such as air-conditioning equipment, audio equipment, etc., that is mounted to the vehicle, and is driven by the battery 14.

The electrical double-layer capacitor 16 is connected via the second DC/DC converter 13 to the alternator wiring 18a that connects the higher-voltage output terminal 7a of the rectifier 7 and the input voltage terminal of the first DC/DC converter 12.

Next, operation of the alternator 2 that is configured in this manner will be explained.

An electric current is supplied to the field winding 4 of the rotor 3 to generate magnetic flux. North-seeking (N) poles and South-seeking (S) poles are thereby formed on outer circumferential portions of the rotor 3 so as to alternate circumferentially. Rotational torque from the engine 1 is transmitted to the shaft of the rotor 3 to drive the rotor 3 to rotate. Thus, rotating magnetic fields are applied to the three-phase alternating-current winding 6 of the stator 5, giving rise to electromotive forces in the three-phase alternating-current winding 6. Alternating currents generated by these electromotive forces are rectified by the rectifier 7 and output as DC power.

Now, if the electric current that is supplied to the field winding 4 is constant, the output voltage of the alternator 2 increases as the rotational speed of the rotor 3 increases. The electric current that flows through the three-phase alternating-current winding 6 is increased by this increase in output voltage, increasing the heat generated in the three-phase alternating-current winding 6. From the viewpoint of safety and reliability, it is preferable to maintain the amount of heat generated in the three-phase alternating-current winding 6 at less than or equal to a certain value. Because of this, the field current that is supplied to the field winding 4 is adjusted by the regulator circuit 9 to adjust the output voltage (the output current). Since the amount of heat generated in the three-phase alternating-current winding 6 depends on the electric current value that flows through the three-phase alternating-current winding 6, in order to achieve greater electric power, it is desirable to keep the output current unchanged, and increase the output voltage. Alternatively, by increasing the output voltage and reducing the electric current, copper loss in the three-phase alternating-current winding 6 and rectifying element loss in the rectifier 7 can be reduced, reducing overall loss and improving electric power generating efficiency, thereby also enabling greater electric power to be achieved.

In the automotive electric power supply system according to Embodiment 1, the battery 14 that constitutes the 14-volt power source is connected to the higher-voltage output terminal 7a of the rectifier 7 by means of the load wiring 18b, the first DC/DC converter 12, and the alternator wiring 18a, and the electrical double-layer capacitor 16 is connected by means of the second DC/DC converter 13 to the alternator wiring 18a that connects the higher-voltage output terminal 7a of the rectifier 7 and the input voltage terminal of the first DC/DC converter 12.

Thus, the alternator 2 is made to generate electric power during vehicle deceleration, and the controlling circuit 17 controls driving of the first and second DC/DC converters 12 and 13, enabling the electric power that is generated by the alternator 2 to be stored in the battery 14 and the electrical double-layer capacitor 16.

Because the electric power that is generated by the alternator 2 is thereby supplied to the battery 14 by means of the first DC/DC converter 12, even if the electric power that is generated by the alternator 2 is changed significantly, the service life of the battery 14 will not be reduced. Thus, because the output voltage of the alternator 2 can be increased to increase the generated electric power if the rotational speed of the engine 1 is high, the recharging time for the battery 14 and the electrical double-layer capacitor 16 can be shortened, and the charging rate can also be increased significantly. As a result, vehicle braking energy can be regenerated efficiently. Thus, because the operation of making the alternator 2 generate electric power during non-deceleration to charge the battery 14 and the electrical double-layer capacitor 16 can be reduced, the load on the engine 1 during non-deceleration is reduced, thereby enabling improvements in vehicle fuel consumption.

Here, by using a DC/DC converter (of voltage type) as one of the first and second DC/DC converters 12 and 13, output electric power can be controlled by setting the output voltage of the alternator 2. By using an electric current controlling function-equipped DC/DC converter as the other of the first and second DC/DC converters 12 and 13, the output electric power from the alternator 2 can be distributed discretionally between the battery 14 and the electrical double-layer capacitor 16.

Embodiment 2

Figure 2:
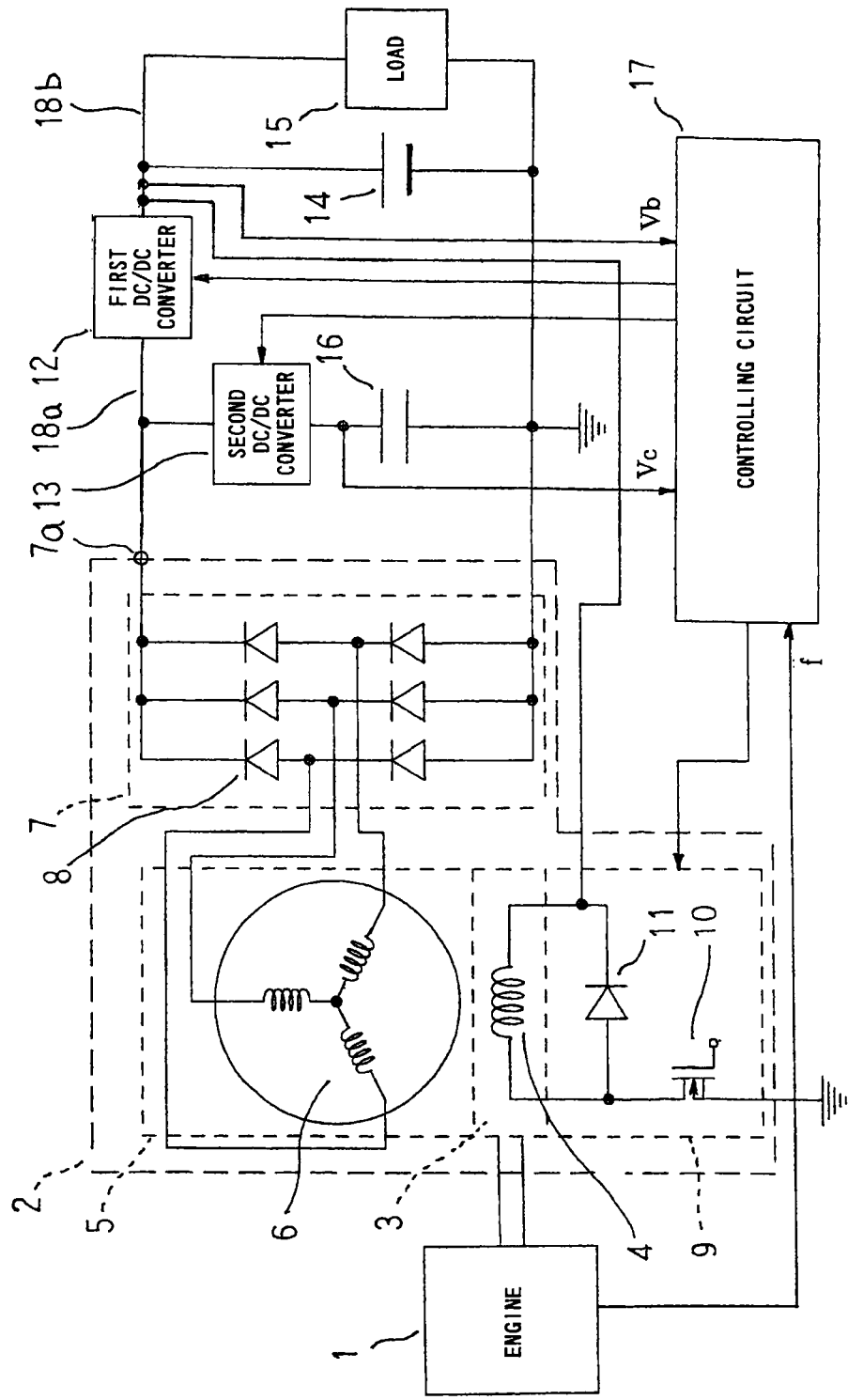
FIG. 2 is a circuit configuration diagram of an automotive electric power supply system according to Embodiment 2 of the present invention.

FIG. 2 is a circuit configuration diagram of an automotive electric power supply system according to Embodiment 2 of the present invention.

In FIG. 2, a cathode terminal of a diode 11 that constitutes a regulator circuit 9 is connected to load wiring 18b that connects an output voltage terminal of a first DC/DC converter 12 and a load 15.

Moreover, an automotive electric power supply system according to Embodiment 2 is configured in a similar manner to Embodiment 1 above except that the cathode terminal of the diode 11 is connected to the load wiring 18b.

Consequently, similar effects to those in Embodiment 1 above are also exhibited in Embodiment 2.

Because the electrical double-layer capacitor 16 self-discharges easily, there is a risk that the terminal voltage Vc may become less than 14 V if the vehicle is stopped for a long time. When the cathode terminal of the diode 11 is connected to the alternator wiring 18a, the operation of the second DC/DC converter 13 cannot be performed if the terminal voltage Vc becomes less than 14 V even if the engine 1 is restarted, giving rise to a situation in which field current cannot be supplied to the alternator 2. Because the battery 14 is less likely to self-discharge compared to the electrical double-layer capacitor 16, drops in voltage can be suppressed in the long term. According to Embodiment 2, because the cathode terminal of the diode 11 is connected to the load wiring 18b, undervoltage of the battery 14 can be suppressed even if the vehicle is stopped for a long time, enabling the occurrence of situations in which field current cannot be supplied to the alternator 2 to be avoided.

Embodiment 3

Figure 3:
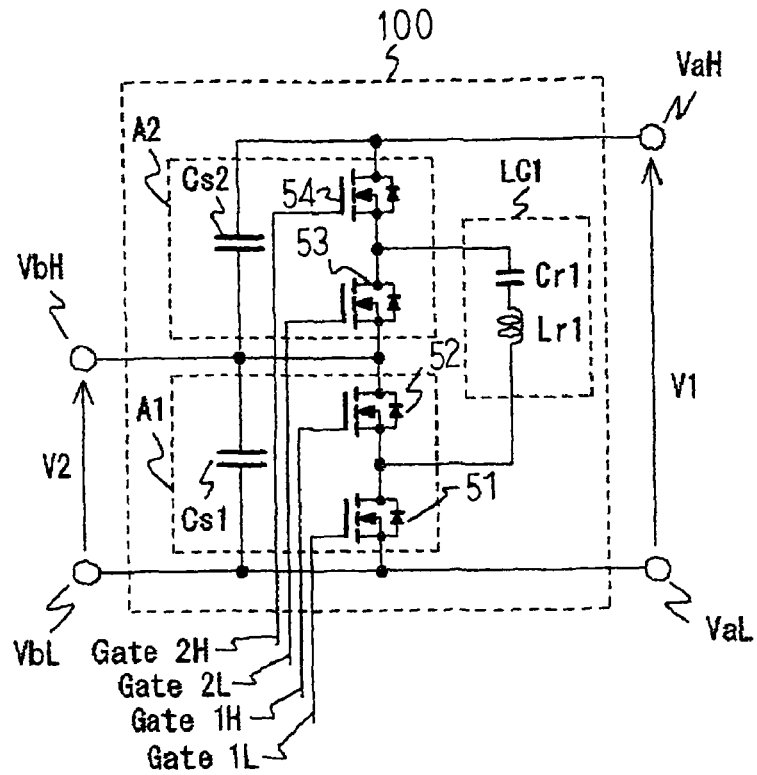
FIG. 3 is a circuit diagram that shows a configuration of a DC/DC converter that is used in an automotive electric power supply system according to Embodiment 3 of the present invention.
Figure 4:
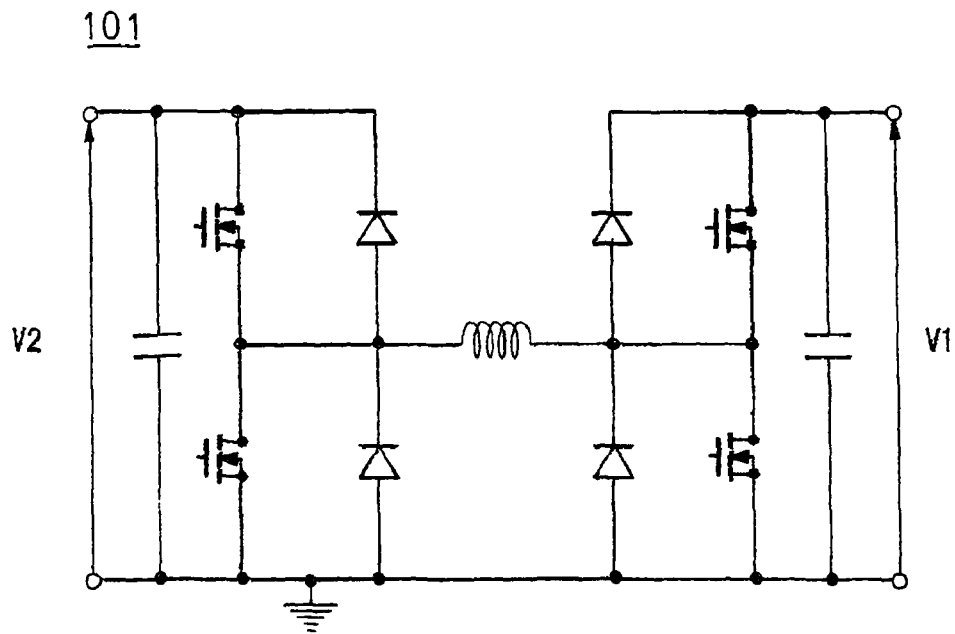
FIG. 4 is a circuit diagram that shows a configuration of a DC/DC converter that is used in the automotive electric power supply system according to Embodiment 3 of the present invention.

FIG. 3 is a circuit diagram that shows a configuration of a DC/DC converter (of voltage type) that is used in an automotive electric power supply system according to Embodiment 3 of the present invention, and FIG. 4 is a circuit diagram that shows a configuration of an electric current controlling function-equipped DC/DC converter that is used in the automotive electric power supply system according to Embodiment 3 of the present invention.

The automotive electric power supply system according to Embodiment 3 is configured in a similar manner to that of the automotive electric power supply system according to Embodiment 1 above except that a DC/DC converter 100 (a DC/DC converter (of voltage type)) that is shown in FIG. 3 is the first DC/DC converter, and an electric current controlling function-equipped DC/DC converter 101 that is shown in FIG. 4 is the second DC/DC converter.

Moreover, the electric current controlling function-equipped DC/DC converter 101 is a chopper-type DC/DC converter in which a function that can control electric current is disposed, and because a general chopper-type bidirectional DC/DC converter is used in this case, as shown in FIG. 4, explanation of voltage conversion will be omitted.

In FIG. 3, the DC/DC converter 100 includes two circuits A1 and A2 that are constituted by: two serial bodies that are formed by connecting two MOSFETs 51 through 54 that function as lower-voltage and higher-voltage switching elements in series between input voltage terminals VaH and VaL and output voltage terminals VbH and VbL; and smoothing capacitors Cs1 and Cs2 that are connected to each of the serial bodies in parallel. The circuits A1 and A2 are connected in series, the circuit A1 being a rectifying circuit, and the circuit A2 being a driving inverter circuit. In addition, an LC serial body LC1 that includes a capacitor Cr1 and an inductor Lr1 for energy transfer is connected between a connecting point between the two MOSFETs 51 and 52 of the circuit A1 and a connecting point between the two MOSFETs 53 and 54 of the circuit A2.

Moreover, the MOSFETs 51 through 54 are power MOSFETs on which parasitic diodes are formed between the sources and the drains. Gate signals Gate 1H, Gate 1L, Gate 2H, and Gate 2L are respectively output from the controlling circuit 17 to the gate terminals of the MOSFETs 51 through 54.

Next, operation of the DC/DC converter 100 will be explained.

Here, the gate signals Gate 1H, Gate 1L, Gate 2H, and Gate 2L are ON/OFF signals that have a duty ratio of 50 percent, the gate signals Gate 1H and Gate 2H being identical signals, and the gate signals Gate 1L and Gate 2L being signals in which the gate signals Gate 1H and Gate 2H are inverted.

First, when the higher-voltage MOSFETs 52 and 54 are switched to the ON state by the gate signals Gate 1H and Gate 2H, a portion of the energy that is stored in the smoothing capacitor Cs2 transfers to the capacitor Cr1 since there is an electric potential difference.

Next, when the higher-voltage MOSFETs 52 and 54 are switched to the OFF state by the gate signals Gate 1H and Gate 2H, and the lower-voltage MOSFETs 51 and 53 are switched to the ON state by the gate signals Gate 1L and Gate 2L, energy that is stored in the capacitor Cr1 transfers to the smoothing capacitor Cs1 since there is an electric potential difference.

The energy that is stored in the smoothing capacitor Cs2 is transferred to the smoothing capacitor Cs1 by charging and discharging the capacitor Cr1 in this manner. A voltage V1 that is input between the input voltage terminals VaH and VaL is output between the output voltage terminals VbH and VbL as a voltage V2 that is stepped down to approximately one half. Moreover, since the electric power of the input voltage V1 is transferred as electric power that is stepped down to the voltage V2, the voltage V1 has a larger value than two times the voltage of the voltage V2.

If the gate signals Gate 2H and Gate 2L are ON signals and the gate signals Gate 1H and Gate 1L are OFF signals, the MOSFETs 53 and 54 are switched to the ON state and the MOSFETs 51 and 52 are switched to the OFF state. The input voltage terminal VaH and the output voltage terminal VbH are thereby switched to a conducting state, and the voltage V1 that is input between the input voltage terminals VaH and VaL is output between the output voltage terminals VbH and VbL as a voltage V2 that is stepped down to approximately one times.

Thus, the DC/DC converter 100 can convert and output the input voltage V1 at a voltage conversion ratio (V2/V1) of one or of one half.

Because the inductor Lr1 is connected to the capacitor Cr1 in series to configure the LC serial body LC1, the transfer of energy uses resonance phenomena, eliminating transient loss when the MOSFETs 51 through 54 change state, and enabling a large amount of energy to be transferred efficiently. Thus, because efficiency is superior, radiators for cooling the circuit can be reduced. Because there is no transient loss during the switching of the MOSFETs 51 through 54, the switching frequency can be set higher. The resonant frequency of the LC serial body LC1 can be increased, and the inductance value of the inductor Lr1 and the capacitance value of the capacitor Cr1 for energy transfer can be set smaller, enabling the circuit elements to be reduced in size. From the above, the DC/DC converter 100 as a whole can be greatly reduced in size.

Figure 5:
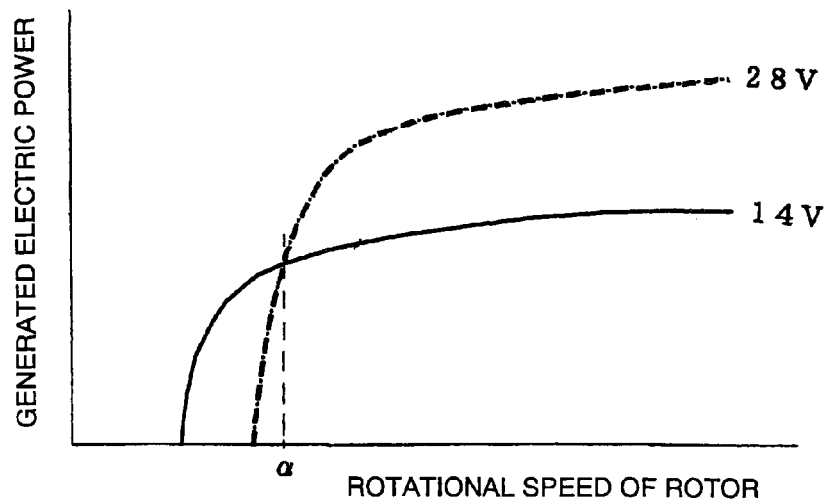
FIG. 5 is a graph that shows output characteristics of an alternator that is used in the automotive electric power supply system according to Embodiment 3 of the present invention.

Output characteristics of an alternator that is used in the automotive electric power supply system according to Embodiment 3 will now be explained. FIG. 5 is a graph that shows output characteristics of an alternator that is used in the automotive electric power supply system according to Embodiment 3 of the present invention, the vertical axis being output electric power, and the horizontal axis being rotational speed of the rotor. Moreover, in FIG. 5, the solid line represents a 14-volt output characteristic curve, and the dotted chain line represents a 28-volt output characteristic curve. Furthermore, the rotational speed of the rotor at a point of intersection between the 14-volt output characteristic curve and the 28-volt output characteristic curve in FIG. 5 will be called α.

As can be seen from FIG. 5, in a region in which the rotational speed is less than α, greater generated electric power can be output if the output voltage is set to 14 V, and in a region in which the rotational speed is greater than or equal to α, greater generated electric power can be output if the output voltage is set to 28 V.

In automobiles, normally a range in which the rotational speed of the engine 1 is 1,000 rpm to 3,000 rpm is most often used. Thus, in a range in which the rotational speed of the engine 1 is 1,000 rpm to 3,000 rpm, a mechanical power transmission ratio of a mechanical power transmission mechanism between the engine 1 and the rotor 3 of the alternator 2 is adjusted so as to obtain the output characteristics that are shown in FIG. 5.

In an automotive electric power supply system according to Embodiment 3, the controlling circuit 17 monitors the rotational speed of the rotor 3, and sets the output voltage to 14 V or 28 V in response to the rotational speed of the rotor 3 when the alternator 2 is generating electric power. Here, the rotational speed of the rotor 3 may be calculated from the rotational speed f of the engine 1 and a pulley ratio (a mechanical power transmission ratio), or may also be detected directly by mounting a rotation sensor to the alternator 2.

First, when the rotational speed of the rotor 3 is less than the rotational speed α, the output voltage is set to 14 V. Here, the controlling circuit 17 switches the MOSFETs 53 and 54 to the ON state, and switches the MOSFETs 51 and 52 to the OFF state, to place the output from the alternator 2 and the output from the DC/DC converter 100 in a short-circuited state. Then the field current to the field winding 4 is adjusted by the regulator circuit 9, the output voltage (V2) of the DC/DC converter 100 is adjusted to 14 V, and the battery 14 is charged. In this operating state, since high-frequency electric current does not flow through the DC/DC converter 100, energy transfer can be made with reduced electric power loss.

When the rotational speed of the rotor 3 is greater than or equal to the rotational speed α, the output voltage is set to 28 V. Here, the controlling circuit 17 repeats ON/OFF operation of the MOSFETs 51 through 54 as described above to maintain a relationship between the output voltage V2 of the DC/DC converter 100 and the output voltage V1 of the alternator 2 so as to be V1=2×V2. Next, the field current to the field winding 4 is adjusted by the regulator circuit 9, the output voltage (V2) of the DC/DC converter 100 is adjusted so as to be 14 V, and the battery 14 is charged. At this point, the output voltage of the alternator 2 is at a value that is slightly greater than 28 V which is two times 14 V.

Here, when modifying n in the voltage conversion ratio (1/n) of the DC/DC converter 100, the controlling circuit 17 places the alternator 2 in a state in which electric power is not generated by controlling the regulator circuit 9 so as to set the field current that is passed to the field winding 4 to zero, and then modifies the voltage transformation conversion ratio.

Moreover, the electric power that is generated by the alternator 2 is charged to the battery 14, and the switching elements of the electric current controlling function-equipped DC/DC converter 101 are also driven and controlled by the controlling circuit 17 such that the electric power that is generated by the alternator 2 is stepped down in output voltage and is stored in the electrical double-layer capacitor 16.

Thus, according to Embodiment 3, because electric power is generated at an output voltage at which the alternator 2 can output greater generated electric power, the recharging time for the battery 14 and the electrical double-layer capacitor 16 can be shortened, and the charging rate can also be increased significantly. As a result, vehicle braking energy can be regenerated efficiently. Thus, because the operation of making the alternator 2 generate electric power during non-deceleration to charge the battery 14 and the electrical double-layer capacitor 16 can be reduced, the load on the engine 1 during non-deceleration is reduced, enabling improvements in vehicle fuel consumption.

Because the voltage conversion ratio of the DC/DC converter 100 is modified in a state in which the alternator 2 is not generating electric power, surges do not occur, enabling situations to be avoided such as internal circuitry being damaged.

Embodiment 4

Figure 6:
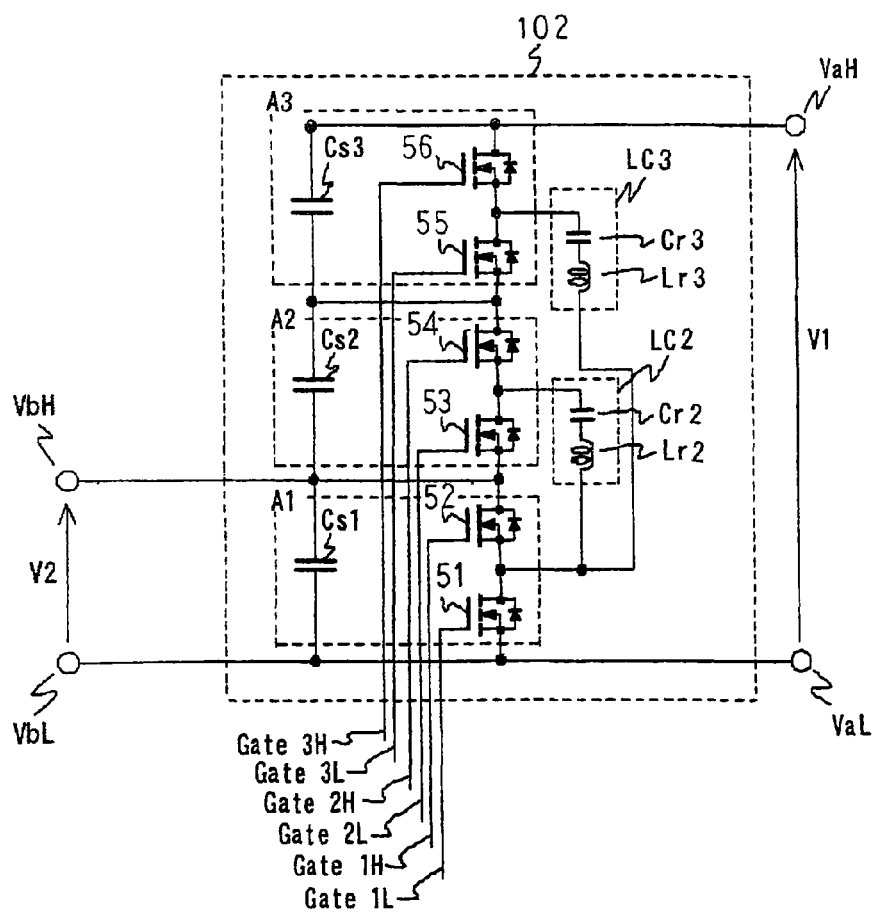
FIG. 6 is a circuit diagram that shows a configuration of a DC/DC converter that is used in an automotive electric power supply system according to Embodiment 4 of the present invention.

FIG. 6 is a circuit diagram that shows a configuration of a DC/DC converter that is used in an automotive electric power supply system according to Embodiment 4 of the present invention.

The automotive electric power supply system according to Embodiment 4 is configured in a similar manner to that of the automotive electric power supply system according to Embodiment 1 above except that a DC/DC converter 102 (a DC/DC converter (of voltage type)) that is shown in FIG. 6 is the first DC/DC converter, and an electric current controlling function-equipped DC/DC converter 101 that is shown in FIG. 4 is the second DC/DC converter.

In FIG. 6, the DC/DC converter 102 includes three circuits A1, A2, and A3 that are constituted by: three serial bodies that are formed by connecting two MOSFETs 51 through 56 that function as lower-voltage and higher-voltage switching elements in series between input voltage terminals VaH and VaL and output voltage terminals VbH and VbL; and smoothing capacitors Cs1, Cs2, and Cs3 that are connected to each of the serial bodies in parallel. The circuits A1, A2, and A3 are connected in series, the circuit A1 being a rectifying circuit, and the circuits A2 and A3 being driving inverter circuits. In addition, an LC serial body LC2 that includes a capacitor Cr2 and an inductor Lr2 for energy transfer is connected between a connecting point between the two MOSFETs 51 and 52 of the circuit A1 and a connecting point between the two MOSFETs 53 and 54 of the circuit A2. Furthermore, an LC serial body LC3 that includes a capacitor Cr3 and an inductor Lr3 for energy transfer is connected between a connecting point between the two MOSFETs 51 and 52 of the circuit A1 and a connecting point between the two MOSFETs 55 and 56 of the circuit A3.

Moreover, the MOSFETs 51 through 56 are power MOSFETs on which parasitic diodes are formed between the sources and the drains. Gate signals Gate 1H, Gate 1L, Gate 2H, Gate 2L, Gate 3H, and Gate 3L are respectively output from the controlling circuit 17 to the gate terminals of the MOSFETs 51 through 56.

Next, operation of the DC/DC converter 102 will be explained.

First, a case in which the voltage conversion ratio of the DC/DC converter 102 is one third will be explained.

The gate signals Gate 1H, Gate 1L, Gate 2H, Gate 2L, Gate 3H, and Gate 3L are ON/OFF signals that have a duty ratio of 50 percent, the gate signals Gate 1H, Gate 2H, and Gate 3H being identical signals, and the gate signals Gate 1L, Gate 2L, and Gate 3L being signals in which the gate signals Gate 1H, Gate 2H, and Gate 3H are inverted.

First, when the higher-voltage MOSFETs 52, 54, and 56 are switched to the ON state by the gate signals Gate 1H, Gate 2H, and Gate 3H, a portion of the energy that is stored in the smoothing capacitors Cs2 and Cs3 respectively transfers to the capacitors Cr2 and Cr3 since there are electric potential differences.

Next, when the higher-voltage MOSFETs 52, 54, and 56 are switched to the OFF state by the gate signals Gate 1H, Gate 2H, and Gate 3H, and the lower-voltage MOSFETs 51, 53, and 55 are switched to the ON state by the gate signals Gate 1L, Gate 2L, and Gate 3L, energy that is stored in the capacitors Cr2 and Cr3 respectively transfers to the smoothing capacitors Cs1 and Cs2 since there are electric potential differences.

The energy that is stored in the smoothing capacitors Cs2 and Cs3 is transferred to the smoothing capacitors Cs2 and Cs1 by charging and discharging the capacitors Cr2 and Cr3 in this manner.

A voltage V1 that is input between the input voltage terminals VaH and VaL is output between the output voltage terminals VbH and VbL as a voltage V2 that is stepped down to approximately one third. Moreover, since the electric power of the input voltage V1 is transferred as electric power that is stepped down to the voltage V2, the voltage V1 has a larger value than three times the voltage of the voltage V2.

Next, a case in which the voltage conversion ratio of the DC/DC converter 102 is one half will be explained.

The gate signals Gate 1H, Gate 1L, Gate 2H, and Gate 2L are ON/OFF signals that have a duty ratio of 50 percent, the gate signals Gate 1L and Gate 2L being signals in which the gate signals Gate 1H and Gate 2H are inverted.

First, when the higher-voltage MOSFETs 52 and 54 are switched to the ON state by the gate signals Gate 1H and 2H, the lower-voltage MOSFETs 51 and 53 are switched to the OFF state by the gate signals Gate 1L and 2L. Thus, a portion of the energy that is stored in the smoothing capacitor Cs2 transfers to the capacitor Cr2 since there is an electric potential difference.

Next, when the higher-voltage MOSFETs 52 and 54 are switched to the OFF state by the gate signals Gate 1H and 2H, and the lower-voltage MOSFETs 51 and 53 are switched to the ON state by the gate signals Gate 1L and 2L, energy that is stored in the capacitor Cr2 transfers to the smoothing capacitor Cs1 since there is an electric potential difference.

The energy that is stored in the smoothing capacitor Cs2 is transferred to the smoothing capacitor Cs1 by charging and discharging the capacitor Cr2 in this manner.

A voltage V1 that is input between the input voltage terminals VaH and VaL is output between the output voltage terminals VbH and VbL as a voltage V2 that is stepped down to approximately one half. Moreover, since the electric power of the input voltage V1 is transferred as electric power that is stepped down to the voltage V2, the voltage V1 has a larger value than two times the voltage of the voltage V2.

Next, a case in which the voltage conversion ratio of the DC/DC converter 102 is one will be explained.

The higher-voltage MOSFETs 54 and 56 and lower-voltage MOSFETs 53 and 55 are kept in the ON state, and the higher-voltage MOSFET 52 and the lower-voltage MOSFET 51 are kept in the OFF state. The input voltage terminal VaH and the output voltage terminal VbH are thereby switched to a conducting state, and the voltage V1 that is input between the input voltage terminals VaH and VaL is output between the output voltage terminals VbH and VbL as a voltage V2 that is stepped down to approximately one times.

Thus, the DC/DC converter 102 can convert and output the input voltage V1 at a voltage conversion ratio (V2/V1) of one, one half, or one third.

In Embodiment 4, because the inductors Lr2 and Lr3 are connected to the capacitors Cr2 and Cr3 in series to configure the LC serial bodies LC2 and LC3, the transfer of energy also uses resonance phenomena, eliminating transient loss when the MOSFETs 51 through 56 change state, and enabling a large amount of energy to be transferred efficiently. Thus, because efficiency is superior, radiators for cooling the circuits can be reduced. Because there is no transient loss during the switching of the MOSFETs 51 through 56, the switching frequency can be set higher. The resonant frequency of the LC serial bodies LC2 and LC3 can be increased, and the inductance value of the inductors Lr2 and Lr3 and the capacitance value of the capacitors Cr2 and Cr3 for energy transfer can be set smaller, enabling the circuit elements to be reduced in size. From the above, the DC/DC converter 102 as a whole can be greatly reduced in size.

Figure 7:
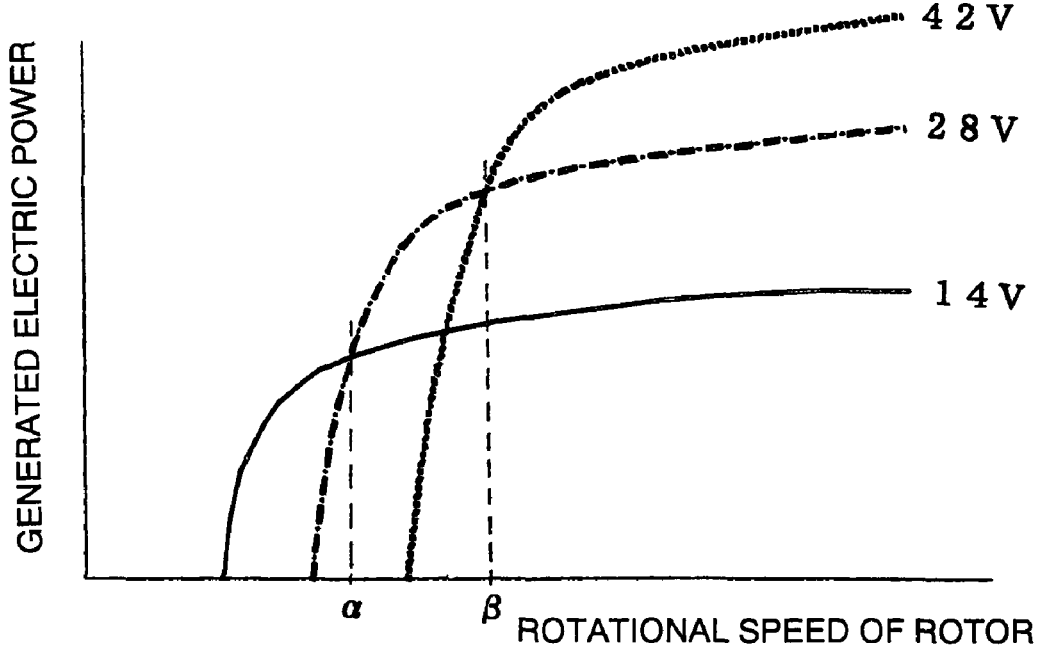
FIG. 7 is a graph that shows output characteristics of an alternator that is used in the automotive electric power supply system according to Embodiment 4 of the present invention.

Output characteristics of an alternator that is used in the automotive electric power supply system according to Embodiment 4 will now be explained. FIG. 7 is a graph that shows output characteristics of an alternator that is used in the automotive electric power supply system according to Embodiment 4 of the present invention, the vertical axis being output electric power, and the horizontal axis being rotational speed of the rotor. Moreover, in FIG. 7, the solid line represents a 14-volt output characteristic curve, the dotted chain line represents a 28-volt output characteristic curve, and the broken line represents a 42-volt output characteristic curve. Furthermore, the rotational speed of the rotor at a point of intersection between the 14-volt output characteristic curve and the 28-volt output characteristic curve in FIG. 7 will be called α, and the rotational speed of the rotor at a point of intersection between the 28-volt output characteristic curve and the 42-volt output characteristic curve in FIG. 7 will be called β.

As can be seen from FIG. 7, in a region in which the rotational speed is less than α, greater generated electric power can be output if the output voltage is set to 14 V, in a region in which the rotational speed is greater than or equal to α and less than β, greater generated electric power can be output if the output voltage is set to 28 V, and in a region in which the rotational speed is greater than or equal to β, greater generated electric power can be output if the output voltage is set to 42 V.

In automobiles, normally a range in which the rotational speed of the engine 1 is 1,000 rpm to 3,000 rpm is most often used. Thus, in a range in which the rotational speed of the engine 1 is 1,000 rpm to 3,000 rpm, a mechanical power transmission ratio of a mechanical power transmission mechanism between the engine 1 and the rotor 3 of the alternator 2 is adjusted so as to obtain the output characteristics that are shown in FIG. 7.

In an automotive electric power supply system according to Embodiment 4, the controlling circuit 17 monitors the rotational speed of the rotor 3, and sets the output voltage to 14 V, 28 V, and 42 V in response to the rotational speed of the rotor 3 when the alternator 2 is generating electric power. Here, the rotational speed of the rotor 3 may be calculated from the rotational speed f of the engine 1 and a pulley ratio (a mechanical power transmission ratio).

First, when the rotational speed of the rotor 3 is less than the rotational speed α, the output voltage is set to 14 V. Here, the controlling circuit 17 switches the MOSFETs 53 through 56 to the ON state, and switches the MOSFETs 51 through 52 to the ON state, to place the output from the alternator 2 and the output from the DC/DC converter 102 in a short-circuited state. Then the field current to the field winding 4 is adjusted by the regulator circuit 9, the output voltage (V2) of the DC/DC converter 102 is adjusted to 14 V, and the battery 14 is charged. At this point, the output voltage of the alternator 2 is at a value that is slightly greater than 14 V. In this operating state, since high-frequency electric current does not flow through the DC/DC converter 102, energy transfer can be made with reduced electric power loss.

When the rotational speed of the rotor 3 is greater than or equal to the rotational speed α and less than β, the output voltage is set to 28 V. Here, the controlling circuit 17 switches the MOSFETs 55 and 56 to the ON state, and repeats ON/OFF operation of the MOSFETs 51 through 54 as described above to maintain a relationship between the output voltage V2 of the DC/DC converter 102 and the output voltage V1 of the alternator 2 so as to be V1=2×V2. Next, the field current to the field winding 4 is adjusted by the regulator circuit 9, the output voltage (V2) of the DC/DC converter 102 is adjusted so as to be 14 V, and the battery 14 is charged. At this point, the output voltage of the alternator 2 is at a value that is slightly greater than 28 V which is two times 14 V.

In addition, when the rotational speed of the rotor 3 is greater than or equal to β, the output voltage is set to 42 V. Here, the controlling circuit 17 repeats ON/OFF operation of the MOSFETs 51 through 56 as described above to maintain a relationship between the output voltage V2 of the DC/DC converter 102 and the output voltage V1 of the alternator 2 so as to be V1=3×V2. Next, the field current to the field winding 4 is adjusted by the regulator circuit 9, the output voltage (V2) of the DC/DC converter 102 is adjusted so as to be 14 V, and the battery 14 is charged. At this point, the output voltage of the alternator 2 is at a value that is slightly greater than 42 V which is three times 14 V.

Here, when modifying n in the voltage conversion ratio (1/n) of the DC/DC converter 102, the controlling circuit 17 places the alternator 2 in a state in which electric power is not generated by controlling the regulator circuit 9 so as to set the field current that is passed to the field winding 4 to zero, and then operates a changeover switch 60 to modify the voltage transformation conversion ratio.

Moreover, the electric power that is generated by the alternator 2 is charged to the battery 14, and the switching elements of the electric current controlling function-equipped DC/DC converter 101 are also driven and controlled by the controlling circuit 17 such that the electric power that is generated by the alternator 2 is stepped down in output voltage and is stored in the electrical double-layer capacitor 16.

Thus, according to Embodiment 4, because electric power is generated at an output voltage at which the alternator 2 can output greater generated electric power, the recharging time for the battery 14 and the electrical double-layer capacitor 16 can be shortened, and the charging rate can also be increased significantly. As a result, vehicle braking energy can be regenerated efficiently. Thus, because the operation of making the alternator 2 generate electric power during non-deceleration to charge the battery 14 and the electrical double-layer capacitor 16 can be reduced, the load on the engine 1 during non-deceleration is reduced, enabling improvements in vehicle fuel consumption.

Because the voltage conversion ratio of the DC/DC converter 102 is modified in a state in which the alternator 2 is not generating electric power, surges do not occur, enabling situations to be avoided such as internal circuitry being damaged.

Moreover, in Embodiments 3 and 4 above, DC/DC converters 100 and 102 (DC/DC converters (of voltage type)) in which a voltage conversion ratio was set to 1/n (where n is an integer) are used as the first DC/DC converter, and general chopper-type bidirectional DC/DC converters (electric current controlling function-equipped DC/DC converters) are used as the second DC/DC converter, but the DC/DC converters 100 and 102 (the DC/DC converters (of voltage type)) may also be used as the second DC/DC converter, and a general chopper-type bidirectional DC/DC converter (an electric current controlling function-equipped DC/DC converter) used as the first DC/DC converter.

Embodiment 5

Figure 8:
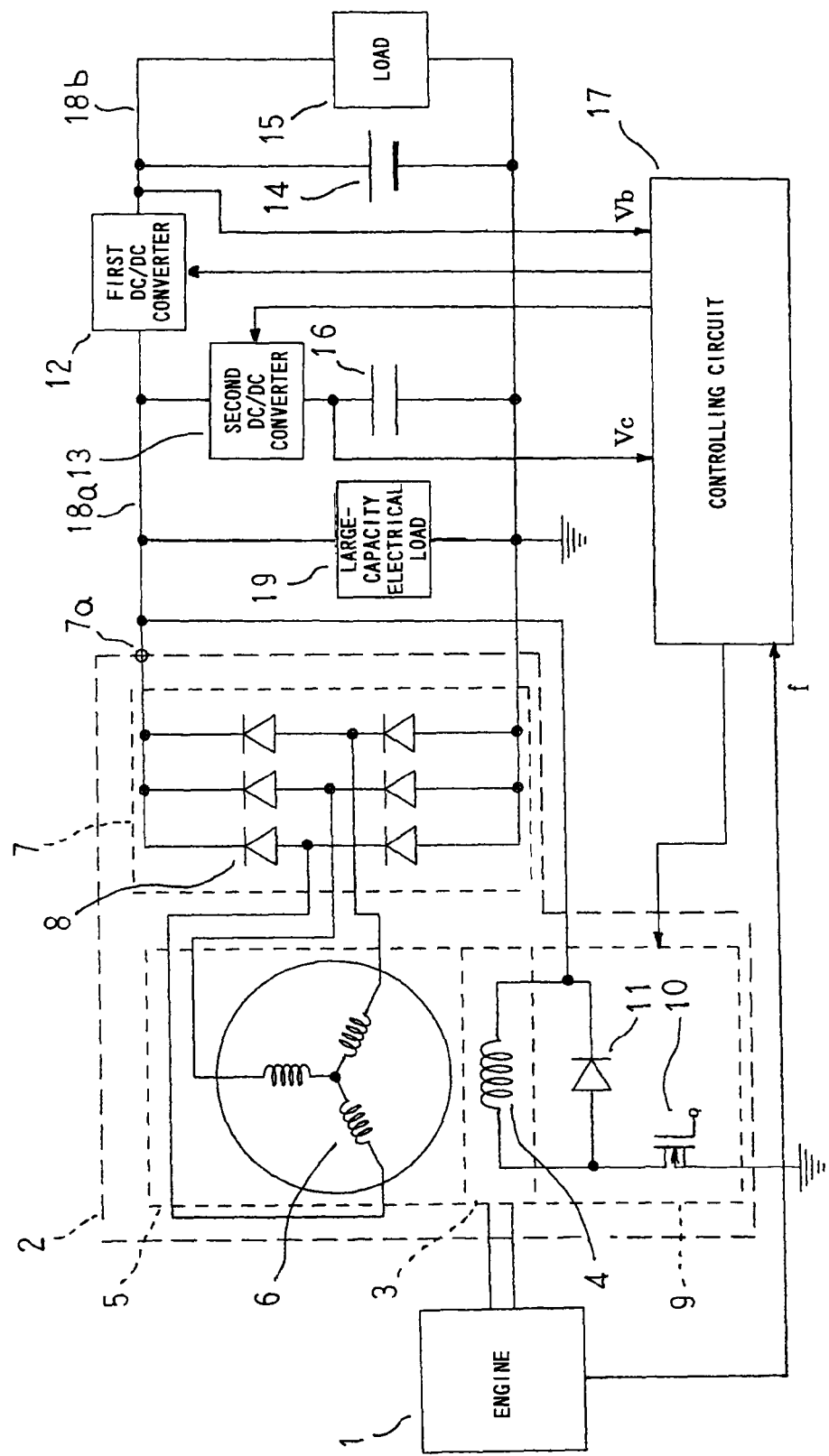
FIG. 8 is a circuit configuration diagram of an automotive electric power supply system according to Embodiment 5 of the present invention.

FIG. 8 is a circuit configuration diagram of an automotive electric power supply system according to Embodiment 5 of the present invention.

In FIG. 8, an electrical double-layer capacitor 16 is connected to a large-capacity electrical load 19 by means of a second DC/DC converter 13. Here, the large-capacity electrical load 19 is a large-capacity load compared to the load 15, and may be, for example, a starter motor that starts an engine 1, an electrically-driven supercharger, or external electrical equipment such as a vacuum cleaner, etc.

Moreover, the rest of the configuration is configured in a similar manner to Embodiment 1 above.

Operation of the automotive electric power supply system according to Embodiment 5 when the large-capacity electrical load 19 is a starter motor will be explained.

First, when a key switch is closed, the controlling circuit 17 switches the switching elements of the second DC/DC converter 13 ON. Electric power that is stored in the electrical double-layer capacitor 16 is thereby supplied to the starter motor (the large-capacity electrical load 19) to drive the starter motor. The controlling circuit 17 monitors starting of the engine 1, and switches the switching elements of the second DC/DC converter 13 OFF when starting of the engine 1 is confirmed.

Because Embodiment 5 is configured such that the electric power that is stored in the electrical double-layer capacitor 16 is supplied to the starter motor, need for increased capacity in the battery 14 is eliminated, suppressing cost increases. Because the discharging performance of the electrical double-layer capacitor 16 is superior to the battery 14, which is constituted by a lead-acid storage battery, etc., the supply of electric power to the starter motor is performed promptly, enabling starting of the engine 1 to be performed swiftly. There is also no deterioration in the service life of the battery 14 that is brought about by large-current discharging during the operation of starting the engine 1.

Embodiment 6

In Embodiment 1 above, the electric power that is generated by the alternator 2 is stored in the battery 14 and the electrical double-layer capacitor 16, but in Embodiment 6, electric power that is generated by the alternator 2 is stored preferentially in the electrical double-layer capacitor 16, which is particularly effective when the electric power that is generated by the alternator 2 is great.

In Embodiment 6, by switching the first DC/DC converter 12 OFF to interrupt connection between the higher-voltage output terminal 7a and the battery 14 of the rectifier 7, the alternator 2 is made to generate electric power when the electric potential of the electrical double-layer capacitor 16 is lower than a predetermined value, and the switching elements of the second DC/DC converter 13 are also switched ON to let only the electrical double-layer capacitor 16 recover the electric power that is generated by the alternator 2. The electric power that is generated by the alternator 2 may also be recovered by the electrical double-layer capacitor 16 by performing control such that the electric power that is generated by the alternator 2 goes to the electrical double-layer capacitor 16 by switching the first DC/DC converter 12 ON and controlling electric current in the second DC/DC converter 13. Then, the controlling circuit 17 monitors the electric potential of the battery 14, and when the electric potential of the battery 14 is lower than a predetermined value, controls driving of the first and second DC/DC converters 12 and 13 to charge the battery 14 using the stored electric power of the electrical double-layer capacitor 16.

In Embodiment 6, because instantaneous large-current charging is not performed on the battery 14 during regeneration, deterioration in the service life of the battery 14 that results from regeneration can be prevented.

Because the switching elements of the first and second DC/DC converters 12 and 13 do not perform switching operations, electric power loss is reduced, enabling the electric power that is generated by the alternator 2 to be recovered efficiently.

Moreover, when the electric power that is generated by the alternator 2 is stored in the electrical double-layer capacitor 16, driving of the second DC/DC converter 13 may also be controlled to reduce the output voltage of the alternator 2 to a predetermined voltage before being stored in the electrical double-layer capacitor 16.

Embodiment 7

Figure 9:
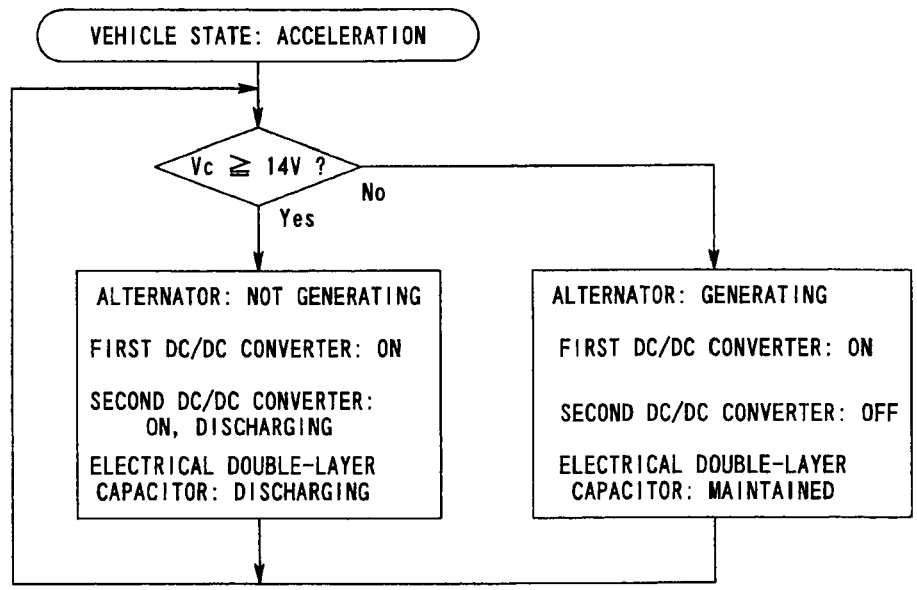
FIG. 9 is a chart that explains operation during vehicle acceleration in an automotive electric power supply system according to Embodiment 7 of the present invention.
Figure 10:
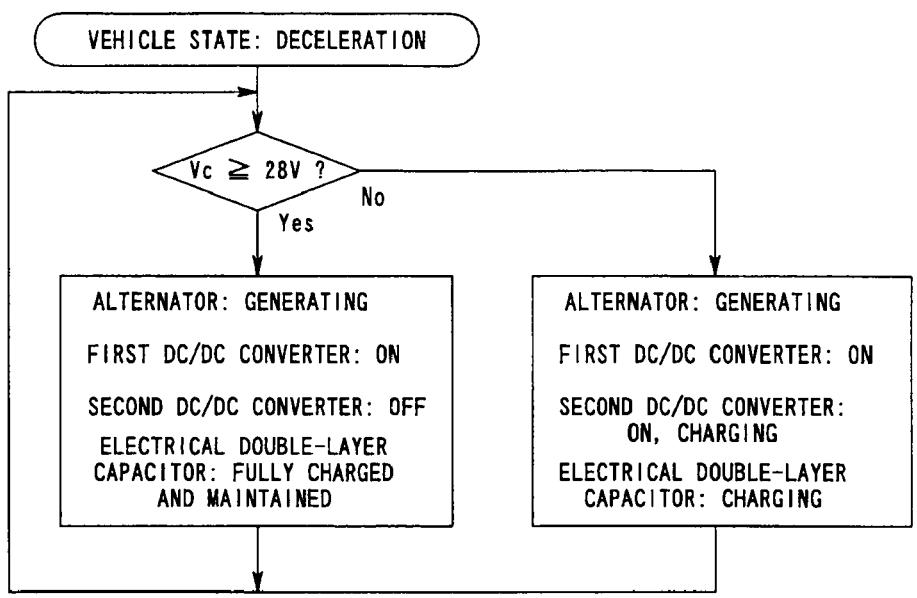
FIG. 10 is a chart that explains operation during vehicle deceleration in the automotive electric power supply system according to Embodiment 7 of the present invention.
Figure 11:
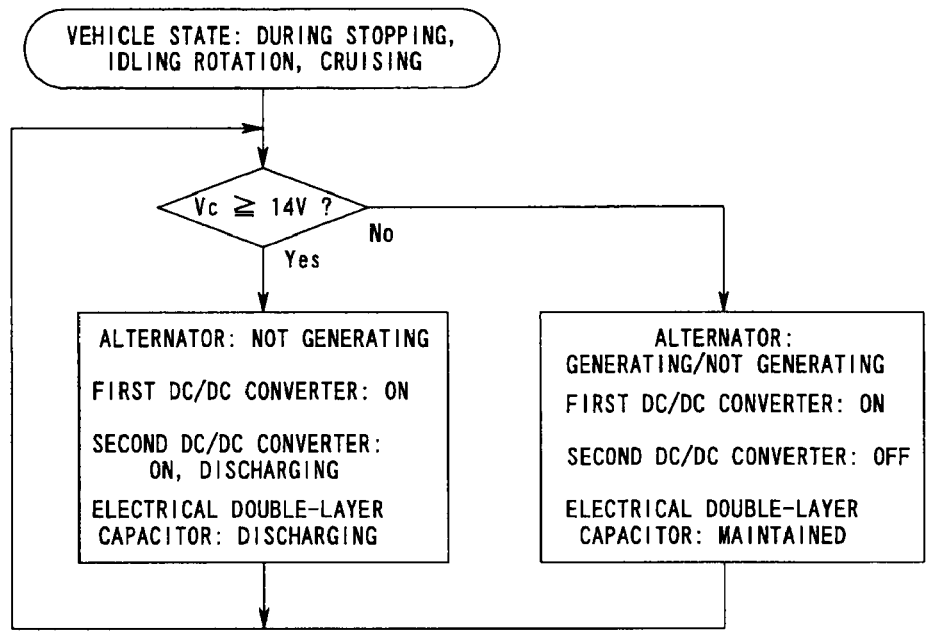
FIG. 11 is a chart that explains operation during vehicle idling in the automotive electric power supply system according to Embodiment 7 of the present invention.

FIG. 9 is a chart that explains operation during vehicle acceleration in an automotive electric power supply system according to Embodiment 7 of the present invention, FIG. 10 is a chart that explains operation during vehicle deceleration in the automotive electric power supply system according to Embodiment 7 of the present invention, and FIG. 11 is a chart that explains operation during vehicle idling in the automotive electric power supply system according to Embodiment 7 of the present invention.

Moreover, in Embodiment 7, operational control of an automotive electric power supply system during acceleration, deceleration, and idling of a vehicle will be explained using the automotive electric power supply system that is shown in FIG. 1.

First, the voltage Vb of the battery 14 (the load wiring 18b), and the terminal voltage Vc of the electrical double-layer capacitor 16 are detected by a voltage sensor (not shown), and the rotational speed f of the engine 1 is detected by a rotation sensor (not shown). The detection signals from the detecting sensor and the rotation sensor are input into the controlling circuit 17. The controlling circuit 17 controls operation of the alternator 2, the first DC/DC converter 12, and the second DC/DC converter 13 based on the running state of the vehicle, the voltage Vb of the battery 14, and the terminal voltage Vc of the electrical double-layer capacitor 16. Moreover, the running state of the vehicle, i.e., acceleration, deceleration, constant-speed movement (cruising), stopping, etc., can be determined from electronic control unit (ECU) signals, increases and decreases in engine rotational speed f, the states of the accelerator pedal and the brake pedal, etc.

Next, feedback control is performed on the charging and discharging electric current of the second DC/DC converter 13 so as to keep the voltage Vb constant at a predetermined first voltage value, for example, 14 V (a control target value). Specifically, if the voltage Vb is lower than 14 V, charging of the battery 14 and electric power supply to the load 15 are performed by controlling operation of the second DC/DC converter 13 so as to increase the discharging capacity from the electrical double-layer capacitor 16. If the voltage Vb is higher than 14 V, operation of the second DC/DC converter 13 is controlled so as to lower the discharging capacity from the electrical double-layer capacitor 16, or so as to charge the electrical double-layer capacitor 16. However, the charging and discharging operation of the electrical double-layer capacitor 16 through the second DC/DC converter 13 is performed only when the terminal voltage Vc is within a predetermined range, and outside that range the second DC/DC converter 13 is stopped. For example, operation of the second DC/DC converter 13 is controlled so as to charge and discharge the electrical double-layer capacitor 16 when the terminal voltage Vc is within a range of 28V through 14V. When the terminal voltage Vc is greater than or equal to 28 V, the electrical double-layer capacitor 16 is determined to be in an overcharged state, and when the terminal voltage Vc becomes less than 14 V, the electrical double-layer capacitor 16 is determined to be in an overdischarged state, and operation of the second DC/DC converter 13 is stopped.

In addition, the alternator 2 is driven by adjusting the field current such that the voltage Vb is at a second voltage value that is lower than 14 V (the first voltage value), for example, 13.5 V (a control target value), during acceleration, during constant-speed movement, and during idling, and such that the voltage Vb is at a third voltage value that is higher than 14 V (the first voltage value), for example, 14.5 V (a control target value), during deceleration. Specifically, if the voltage Vb is lower than the control target value, the field current is increased to increase the amount of power that is generated by the alternator 2, and if the voltage Vb is higher than the control target value, the field current is reduced to reduce the amount of power that is generated by the alternator 2.

Here, because the amount that is subject to control is implemented by means of the first DC/DC converter 12, if the first DC/DC converter 12 is performing 2:1 voltage conversion, control to keep the voltage Vb constant at 14 V means controlling operation of the second DC/DC converter 13 such that the voltage of the alternator wiring 18a is 28 V. If the first DC/DC converter 12 is performing the 1:1 voltage conversion, control to keep the voltage Vb constant at 14 V means controlling operation of the second DC/DC converter 13 such that the voltage of the alternator wiring 18a is 14 V.

Furthermore, operation of the first DC/DC converter 12 is controlled so as to change a voltage transformation ratio between the lower-voltage side and the higher-voltage side so as to perform 1:1 voltage conversion if the engine rotational speed f is in the idling region, i.e., less than 1,000 rpm, for example, and so as to perform 2:1 voltage conversion if greater than or equal to 1,000 rpm.

Next, operation of the alternator 2, the first DC/DC converter 12, and the second DC/DC converter 13 when the vehicle is accelerating will be explained with reference to FIG. 9.

If it is determined that the vehicle is in an accelerating state, the controlling circuit 17 sets the control target value of the alternator 2 to 13.5 V, and sets the control target value of the second DC/DC converter 13 to 14 V. Because the engine rotational speed f is greater than or equal to 1,000 rpm in the accelerating state of the vehicle, operation of the first DC/DC converter 12 is controlled so as to perform 2:1 voltage conversion.

If it is determined that the terminal voltage Vc is greater than or equal to 14 V, operation of the second DC/DC converter 13 is controlled such that the voltage Vb is 14 V. In other words, operation of the second DC/DC converter 13 is controlled such that the voltage of the alternator wiring 18a is 28 V. The electric power that is stored in the electrical double-layer capacitor 16 is thereby discharged, and required electric power is supplied to the load 15, or the battery 14 is charged. Thus, because the voltage Vb is higher than 13.5 V, which is the control target value of the alternator 2, there is no passage of field current to the alternator 2, and the alternator 2 is in a non-generating state.

If the electric power that is stored in the electrical double-layer capacitor 16 is discharged, and the terminal voltage Vc becomes lower than 14 V, operation of the second DC/DC converter 13 is stopped. Then, if the voltage Vb becomes lower than 13.5 V, the alternator 2 is operated to generate power, and the electric power is supplied to the load 15. Here, the field current that is passed through the alternator 2 is adjusted such that the voltage Vb becomes 13.5 V, and the output voltage of the alternator 2, i.e., the voltage of the alternator wiring 18a, becomes 27 V.

Next, operation of the alternator 2, the first DC/DC converter 12, and the second DC/DC converter 13 when the vehicle is decelerating will be explained with reference to FIG. 10.

If it is determined that the vehicle is in a decelerating state, the controlling circuit 17 sets the control target value of the alternator 2 to 14.5 V, and sets the control target value of the second DC/DC converter 13 to 14 V. Because the engine rotational speed f is greater than or equal to 1,000 rpm in the decelerating state of the vehicle, operation of the first DC/DC converter 12 is controlled so as to perform 2:1 voltage conversion.

The field current that is passed through the alternator 2 is then adjusted such that the voltage Vb is 14.5 V, and the alternator 2 is operated to generate power. Thus, the output voltage of the alternator 2, i.e., the voltage of the alternator wiring 18a, becomes 29 V. The voltage of the alternator wiring 18a is then converted at 2:1 by the first DC/DC converter 12, and the voltage of the load wiring 18b becomes 14.5 V. Thus, the voltage Vb is higher than 14 V, which is the control target value of the second DC/DC converter 13.

If it is determined that the terminal voltage Vc is less than 28 V, operation of the second DC/DC converter 13 is controlled such that required electric power is supplied to the load 15, and surplus electric power is stored in the electrical double-layer capacitor 16. In other words, if the voltage Vb is maintained at 14 V, the electric power that is required by the load 15 can be supplied, and because the control target value of the alternator 2 is 14.5 V, electric power that exceeds 14 V is surplus electric power, and is stored in the electrical double-layer capacitor 16.

If the decelerating state continues, and the electrical double-layer capacitor 16 reaches a fully charged state, and the terminal voltage Vc becomes greater than or equal to 28 V, operation of the second DC/DC converter 13 is stopped. The electric power that is generated by the alternator 2 is supplied to the load 15 and the battery 14.

Next, operation of the alternator 2, the first DC/DC converter 12, and the second DC/DC converter 13 when the vehicle is idling will be explained with reference to FIG. 11.

If it is determined that the vehicle is in an idling state, the controlling circuit 17 sets the control target value of the alternator 2 to 13.5 V, and sets the control target value of the second DC/DC converter 13 to 14 V. Because the engine rotational speed f is less than 1,000 rpm in the idling state of the vehicle, operation of the first DC/DC converter 12 is controlled so as to perform 1:1 voltage conversion.

If it is determined that the terminal voltage Vc is greater than or equal to 14 V, operation of the second DC/DC converter 13 is controlled such that the voltage Vb is 14 V. In other words, operation of the second DC/DC converter 13 is controlled such that the voltage of the alternator wiring 18a is 14 V. The electric power that is stored in the electrical double-layer capacitor 16 is thereby discharged, and required electric power is supplied to the load 15, or the battery 14 is charged. Thus, because the voltage Vb is higher than 13.5 V, which is the control target value of the alternator 2, there is no passage of field current to the alternator 2, and the alternator 2 is in a non-generating state.

If the electric power that is stored in the electrical double-layer capacitor 16 is discharged, and the terminal voltage Vc becomes lower than 14 V, operation of the second DC/DC converter 13 is stopped. Then, if the voltage Vb becomes lower than 13.5 V, the alternator 2 is operated to generate power, and the electric power is supplied to the load 15. Here, the field current that is passed through the alternator 2 is adjusted such that the voltage Vb becomes 13.5 V, and the output voltage of the alternator 2, i.e., the voltage of the alternator wiring 18a, becomes 13.5 V.

Here, when the vehicle is in a constant-speed movement (cruising) state, operation of the first DC/DC converter 12 is controlled so as to perform 2:1 voltage conversion because the engine rotational speed f is greater than or equal to 1,000 rpm. Thus, when the vehicle is in the constant-speed movement state, if the terminal voltage Vc is greater than or equal to 14 V in FIG. 11, operation of the second DC/DC converter 13 is controlled such that the voltage of the alternator wiring 18a is 28 V, and the alternator 2 is in a non-generating state. If the terminal voltage Vc is less than 14 V, operation of the second DC/DC converter 13 is stopped, and the field current that is passed through the alternator 2 is adjusted such that the voltage of the alternator wiring 18a becomes 27 V.

When the vehicle is stopped, if the terminal voltage Vc is less than 14 V in FIG. 11, the alternator 2 is placed in a non-generating state. Moreover, the rest of the operation is similar to operation in the idling state.

Now, in conventional electric power supply systems, a system controlling electronic control unit (ECU) has been required, and the ECU distinguished separate information for each of the items of equipment and determined the power generating state. Thus, the amount of computation in the ECU and communications traffic between the ECU and each of the items of equipment has been huge. If the present electric power supply system is adopted, it becomes possible to perform energy regeneration control during deceleration passively and optimally by setting a separate control target value for each item of equipment, and controlling each item of equipment in response to the control target value. Control over each item of equipment from the ECU can thereby be simplified or eliminated.

Embodiment 8

Figure 12:
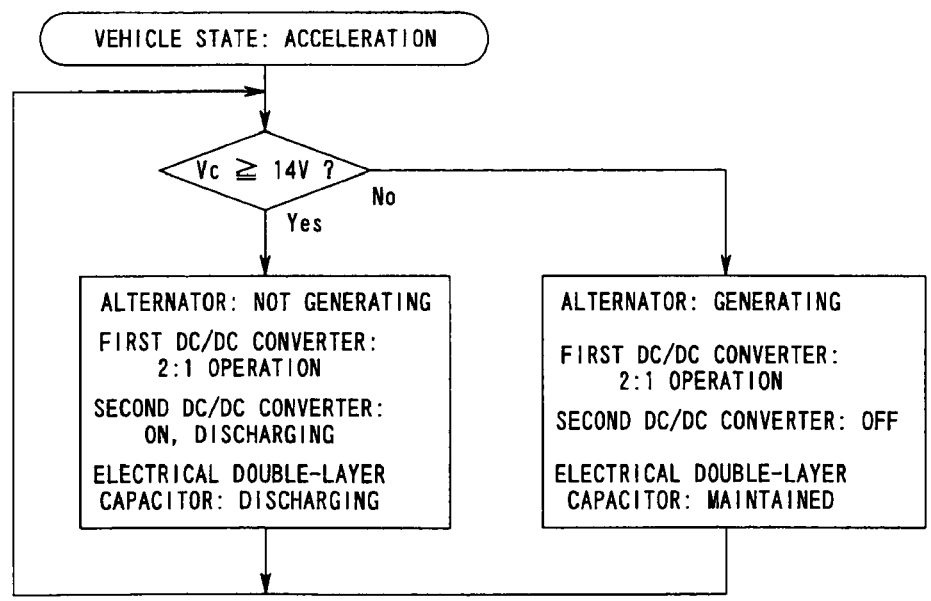
FIG. 12 is a chart that explains operation during vehicle acceleration in an automotive electric power supply system according to Embodiment 8 of the present invention.
Figure 13:
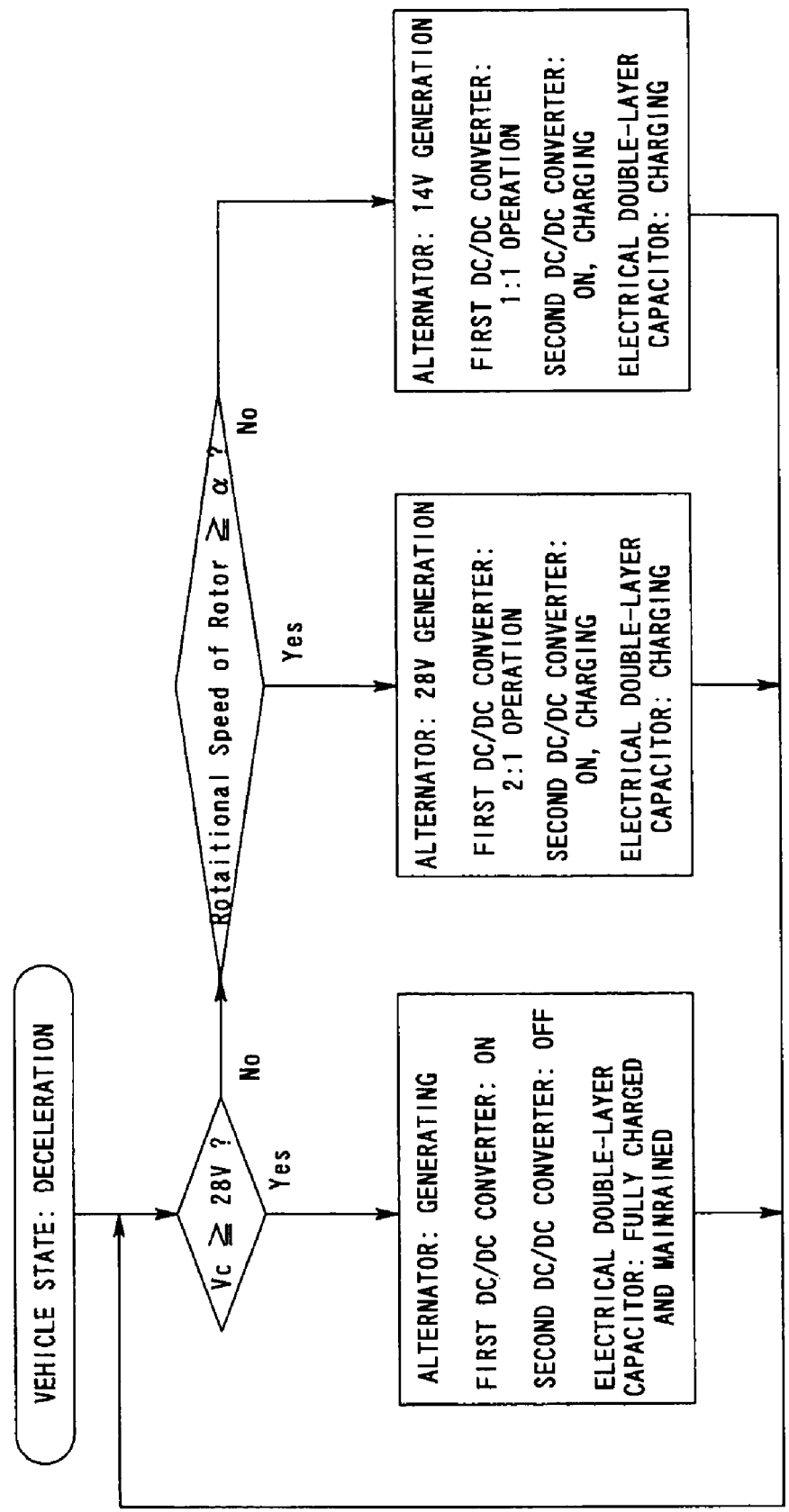
FIG. 13 is a chart that explains operation during vehicle deceleration in the automotive electric power supply system according to Embodiment 8 of the present invention.

FIG. 12 is a chart that explains operation during vehicle acceleration in an automotive electric power supply system according to Embodiment 8 of the present invention, and FIG. 13 is a chart that explains operation during vehicle deceleration in the automotive electric power supply system according to Embodiment 8 of the present invention.

In Embodiment 7 above, operation of the first DC/DC converter 12 is controlled so as to convert voltage at 1:1 when the engine rotational speed f is less than 1,000 rpm, and to convert voltage at 2:1 at greater than or equal to 1,000 rpm, but in Embodiment 8, operation of the first DC/DC converter 12 is controlled so as to convert voltage at 1:1 when the rotational speed of the rotor 3 is less than the rotational speed α, and to convert voltage at 2:1 at greater than or equal to the rotational speed α. Moreover, other operating conditions are similar to those of Embodiment 7 above.

First, operation of the alternator 2, the first DC/DC converter 12, and the second DC/DC converter 13 when the vehicle is accelerating will be explained with reference to FIG. 12.

If it is determined that the vehicle is in an accelerating state, the controlling circuit 17 sets the control target value of the alternator 2 to 13.5 V, and sets the control target value of the second DC/DC converter 13 to 14 V. Moreover, in FIG. 12, operation of the first DC/DC converter 12 is controlled so as to convert voltage at 2:1, but when the rotational speed of the rotor 3 is less than the rotational speed α, operation of the first DC/DC converter 12 is controlled so as to convert voltage at 1:1.

If it is determined that the terminal voltage Vc is greater than or equal to 14 V, operation of the second DC/DC converter 13 is controlled such that the voltage Vb is 14 V. The electric power that is stored in the electrical double-layer capacitor 16 is thereby discharged, and required electric power is supplied to the load 15, or the battery 14 is charged. Thus, because the voltage Vb is higher than 13.5 V, which is the control target value of the alternator 2, there is no passage of field current to the alternator 2, and the alternator 2 is in a non-generating state.

If the electric power that is stored in the electrical double-layer capacitor 16 is discharged, and the terminal voltage Vc becomes lower than 14 V, operation of the second DC/DC converter 13 is stopped. Then, if the voltage Vb becomes lower than 13.5 V, the alternator 2 is operated to generate power, and the electric power is supplied to the load 15. Here, the field current that is passed through the alternator 2 is adjusted such that the voltage Vb becomes 13.5 V.

Next, operation of the alternator 2, the first DC/DC converter 12, and the second DC/DC converter 13 when the vehicle is decelerating will be explained with reference to FIG. 13.

If it is determined that the vehicle is in a decelerating state, the controlling circuit 17 sets the control target value of the alternator 2 to 14.5 V, and sets the control target value of the second DC/DC converter 13 to 14 V.

If it is determined that the terminal voltage Vc is greater than or equal to 28 V, operation of the second DC/DC converter 13 is stopped, the field current that is passed through the alternator 2 is adjusted such that the voltage Vb is 14.5 V, and the alternator 2 is operated to generate power. Here, operation of the first DC/DC converter 12 is controlled so as to convert voltage at 1:1 if the rotational speed of the rotor 3 is less than the rotational speed α, and to convert voltage at 2:1 at greater than or equal to the rotational speed α.

If it is determined that the terminal voltage Vc is less than 28 V, it is then determined whether or not the rotational speed of the rotor 3 is greater than or equal to the rotational speed α.

Then, if the rotational speed of the rotor 3 is greater than or equal to the rotational speed α, operation of the first DC/DC converter 12 is controlled so as to convert voltage at 2:1, the field current that is passed through the alternator 2 is adjusted such that the voltage Vb is 14.5 V, and the alternator 2 is operated to generate power. In addition, operation of the second DC/DC converter 13 is controlled such that required electric power is supplied to the load 15, and electric power that exceeds 14 V is stored in the electrical double-layer capacitor 16. Moreover, if the decelerating state continues, and the electrical double-layer capacitor 16 reaches a fully charged state, and the terminal voltage Vc becomes greater than or equal to 28 V, operation of the second DC/DC converter 13 is stopped. The electric power that is generated by the alternator 2 is supplied to the load 15 and the battery 14.

If the rotational speed of the rotor 3 is less than the rotational speed α, operation of the first DC/DC converter 12 is controlled so as to convert voltage at 1:1, the field current that is passed through the alternator 2 is then adjusted such that the voltage Vb is 14.5 V, and the alternator 2 is operated to generate power.

Operation of the second DC/DC converter 13 is controlled such that required electric power is supplied to the load 15, and electric power that exceeds 14 V is stored in the electrical double-layer capacitor 16.

If the decelerating state continues, and the electrical double-layer capacitor 16 reaches a fully charged state, and the terminal voltage Vc becomes greater than or equal to 28 V, operation of the second DC/DC converter 13 is stopped. The electric power that is generated by the alternator 2 is supplied to the load 15 and the battery 14.

Moreover, because control during idling, cruising, and stopping is similar or identical to that of Embodiment 7 above, explanation thereof will be omitted here.

According to Embodiment 8, because driving of the alternator 2 is controlled in consideration of the output characteristics of the alternator 2 that are shown in FIG. 5 so as to enable electric power to be generated at an output voltage that can output greater generated electric power if the rotational speed of the rotor 3 is greater than or equal to the rotational speed α, the recharging time for the battery 14 and the electrical double-layer capacitor 16 can be shortened, and the charging rate can also be increased significantly. As a result, vehicle braking energy can be regenerated efficiently. Thus, because the operation of making the alternator 2 generate electric power during non-deceleration to charge the battery 14 and the electrical double-layer capacitor 16 can be reduced, the load on the engine 1 during non-deceleration is reduced, enabling improvements in vehicle fuel consumption.

Embodiment 9

Figure 14:
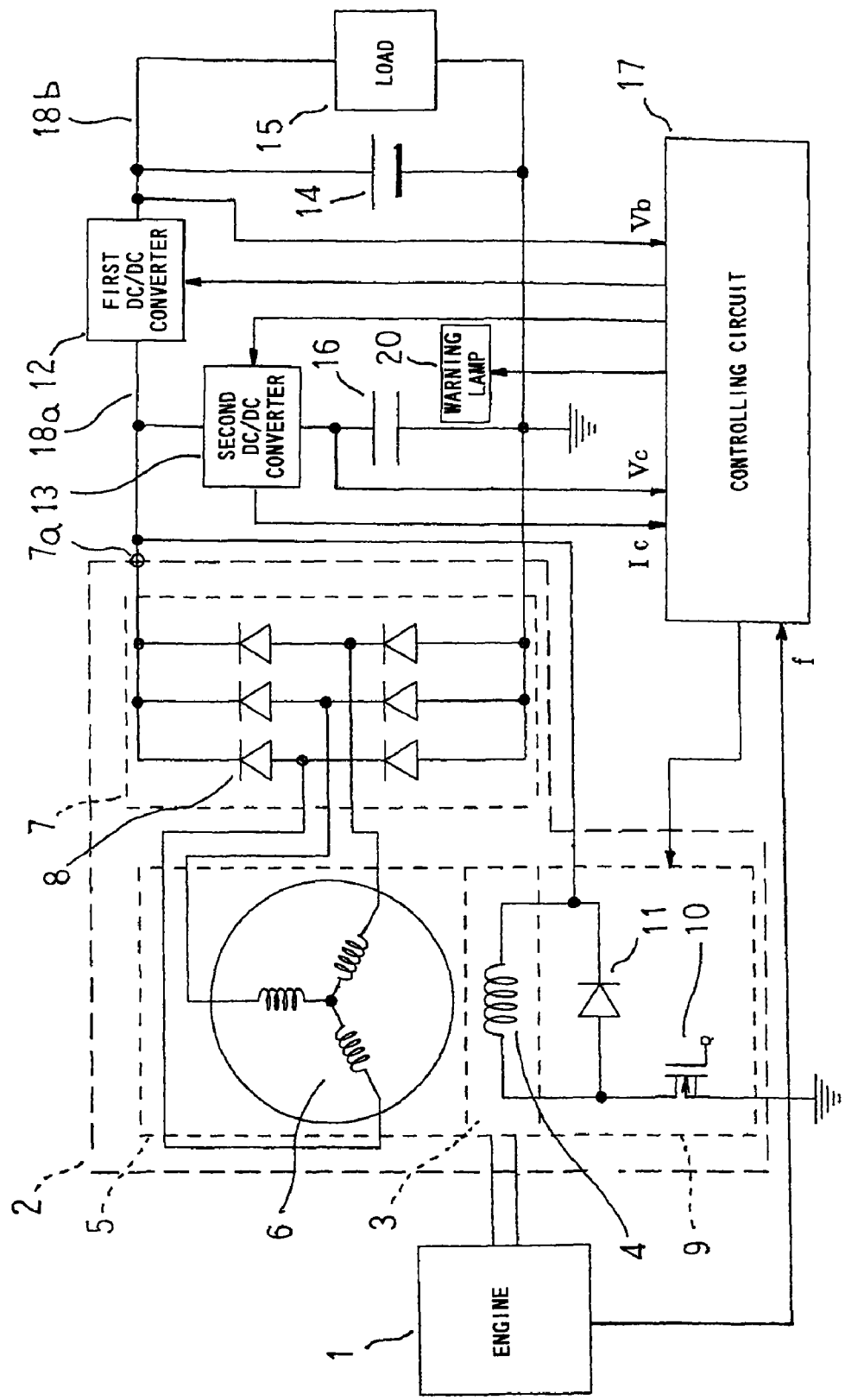
FIG. 14 is a circuit configuration diagram of an automotive electric power supply system according to Embodiment 9 of the present invention.
Figure 15:
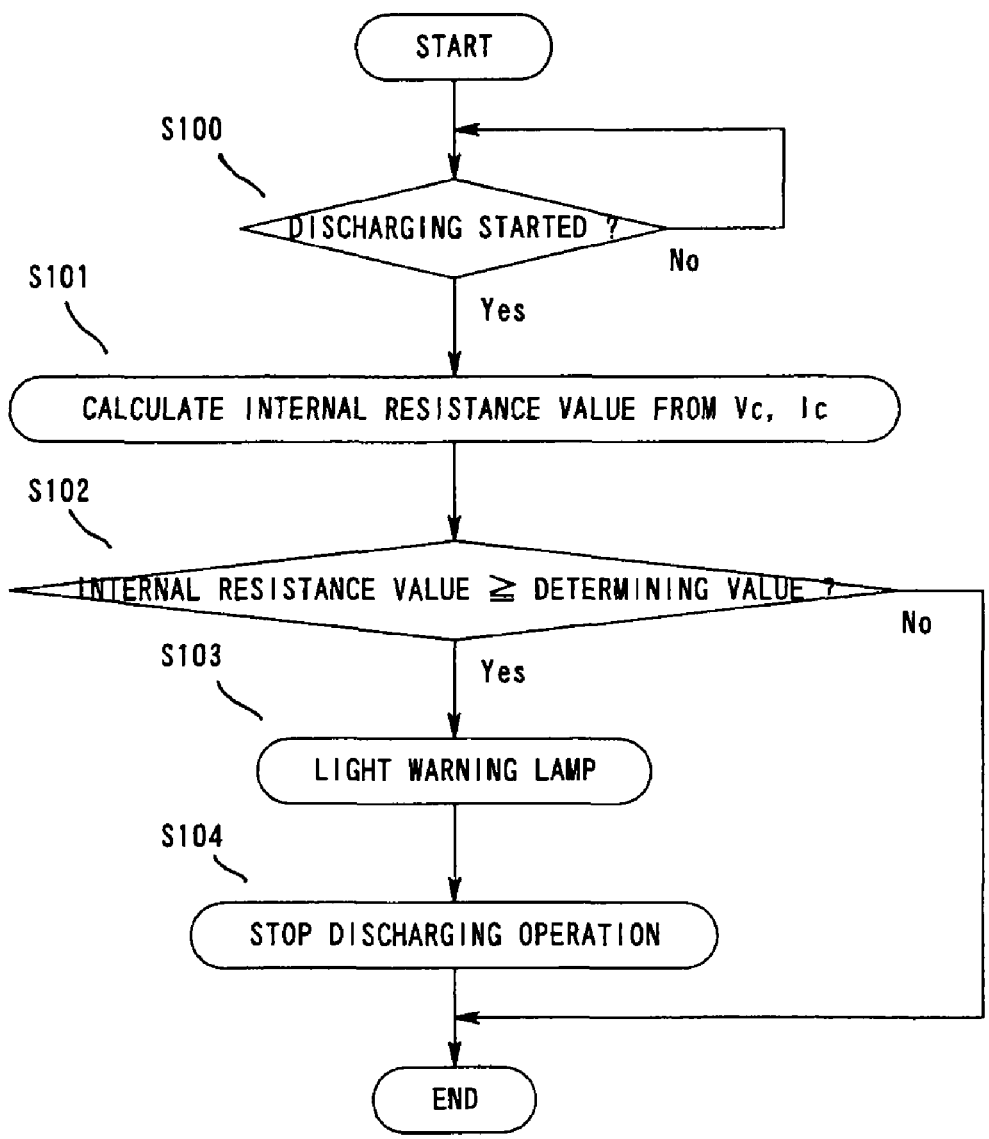
FIG. 15 is a chart that explains a system protecting operation in the automotive electric power supply system according to Embodiment 9 of the present invention.

FIG. 14 is a circuit configuration diagram of an automotive electric power supply system according to Embodiment 9 of the present invention, and FIG. 15 is a chart that explains a system protecting operation in the automotive electric power supply system according to Embodiment 9 of the present invention.

In FIG. 14, a warning lamp 20 that functions as a notifying means is installed, for example, on a vehicle dashboard, and is controlled by a controlling circuit 17 so as to switch ON/OFF to notify the driver of an abnormality in the state of an electrical double-layer capacitor 16 by being lit. A second DC/DC converter 13 is constituted by the electric current controlling mechanism-equipped DC/DC converter 101 that is shown in FIG. 4.

Moreover, the rest of the configuration is configured in a similar manner to Embodiment 1 above.

Next, a system protecting operation of an automotive electric power supply system by the controlling circuit 17 will be explained based on FIG. 15. Moreover, S100 through S104 in FIG. 15 represent Steps 100 through 104.

First, the controlling circuit 17 determines whether or not the second DC/DC converter 13 has started a discharging operation (Step 100). If it is determined that the second DC/DC converter 13 has started the discharging operation, electric current that flows through the second DC/DC converter 13, i.e., the discharging current Ic of the electrical double-layer capacitor 16, and the terminal voltage Vc of the electrical double-layer capacitor 16 are taken in, and the internal resistance value of the electrical double-layer capacitor 16 in an initial discharging state is calculated (Step 101).

Next, it is determined whether or not the calculated internal resistance value is greater than or equal to a determining value (Step 102). If the calculated internal resistance value is greater than or equal to the determining value at Step 102, then it is deemed that there is an abnormality in the state of the electrical double-layer capacitor 16 (a temperature anomaly or deterioration), and the controlling circuit 17 proceeds to Step 103 and lights the warning lamp 20. The controlling circuit 17 then proceeds to Step 104, stops the discharging operation by the second DC/DC converter 13, and terminates the system protecting operation. If it is determined that the electrical double-layer capacitor 16 is in an abnormal state (a temperature anomaly or deterioration), the charging operation is also stopped. If the calculated internal resistance value is less than the determining value at Step 102, it is deemed that the electrical double-layer capacitor 16 is normal, and the system protecting operation is terminated.

Here, the determining value is an internal resistance value that constitutes an indicator for determining an abnormal state (a temperature anomaly or the deterioration) of the electrical double-layer capacitor 16, and is set to 1.4 times an initial internal resistance value of the electrical double-layer capacitor for reasons such as that a temperature estimate of the electrical double-layer capacitor can be made from the resistance value, that the service life of the electrical double-layer capacitor is shortened if the temperature is high, and that the resistance may be higher due to factors other than temperature, such as electrolytic solution leakage, for example.

When considering only temperature, a resistance value that is 1.4 times corresponds to a temperature increase of approximately 120 degrees Celsius. Temperature rising 120 degrees Celsius means that the service life is approximately 1/1000 due to a relationship between temperature and the service life of the electrical double-layer capacitor (if the temperature rises 10 degrees Celsius, service life is halved), shortening service life significantly.

According to Embodiment 9, the controlling circuit 17 determines the state of the electrical double-layer capacitor 16 at commencement of discharging of the second DC/DC converter 13 based on the internal resistance value at commencement of discharging, and lights the warning lamp 2 if it determines that the electrical double-layer capacitor 16 is not normal, i.e., that there is a temperature anomaly or deterioration. Thus, the driver can recognize that the electrical double-layer capacitor 16 is in an abnormal state by the warning lamp 20 being lit, and know that the replacement period for the electrical double-layer capacitor 16 has arrived.

Because the controlling circuit 17 stops the discharging operation of the second DC/DC converter 13 if it determines that the electrical double-layer capacitor 16 is in an abnormal state (a temperature anomaly or deterioration), system failure that would result from the second DC/DC converter 13 continuing the discharging operation can be prevented. Since the charging operation is also stopped, system failure that would result from continuing to charge can be prevented. Moreover, because the electric power that is generated by the alternator 2 or electric power from the battery 14 is supplied to the load 15 even if the discharging operation of the second DC/DC converter 13 is stopped, operation of the load 15 is not hindered.

Embodiment 10

Figure 16:
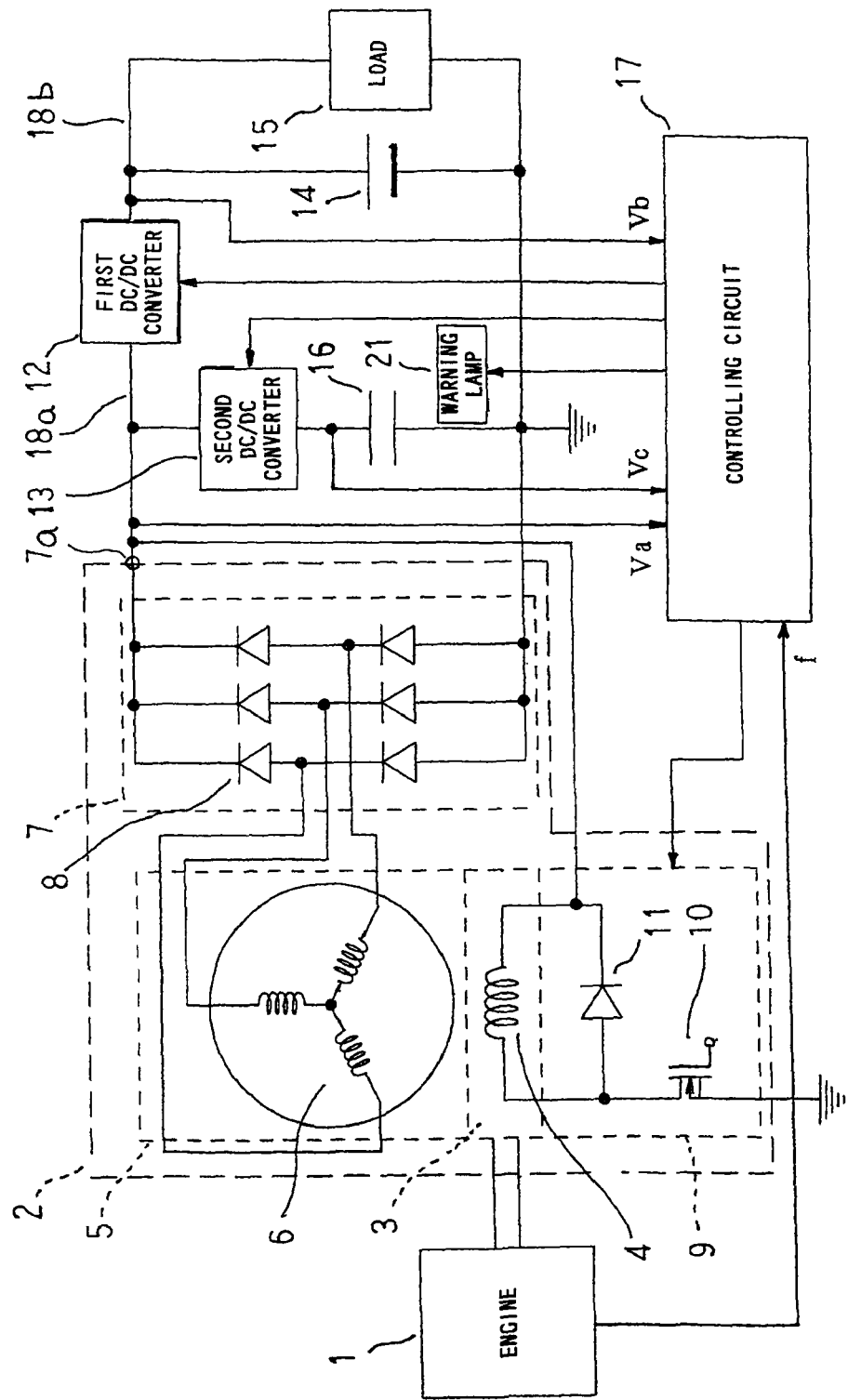
FIG. 16 is a circuit configuration diagram of an automotive electric power supply system according to Embodiment 10 of the present invention.
Figure 17:
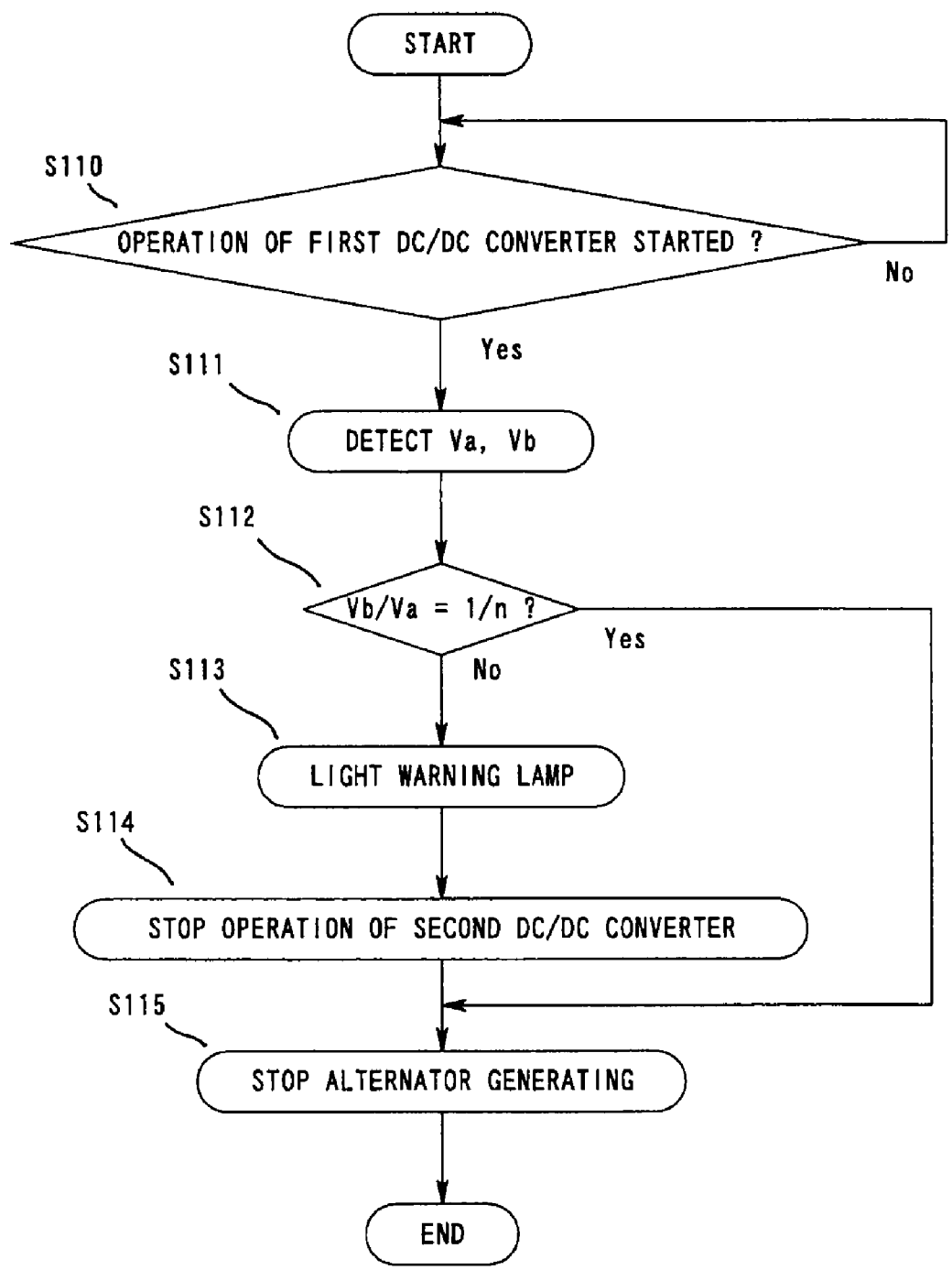
FIG. 17 is a chart that explains a system protecting operation in the automotive electric power supply system according to Embodiment 10 of the present invention.

FIG. 16 is a circuit configuration diagram of an automotive electric power supply system according to Embodiment 10 of the present invention, and FIG. 17 is a chart that explains a system protecting operation in the automotive electric power supply system according to Embodiment 10 of the present invention.

In FIG. 16, a warning lamp 21 that functions as a notifying means is installed, for example, on a vehicle dashboard, and is controlled by a controlling circuit 17 so as to switch ON/OFF to notify the driver of an abnormality in the operation of a first DC/DC converter 12 by being lit.

Moreover, the rest of the configuration is configured in a similar manner to Embodiment 1 above.

Next, a system protecting operation of an automotive electric power supply system by the controlling circuit 17 will be explained based on FIG. 17. Moreover, S110 through S115 in FIG. 17 represent Steps 110 through 115.

First, the controlling circuit 17 determines whether or not the first DC/DC converter 12 has started a discharging operation (Step 110). If it is determined that the first DC/DC converter 12 has started the operation, the voltage Va of the alternator wiring 18a and the voltage Vb of the load wiring 18b are taken in (Step 111). Next, the voltage conversion ratio (1/n) at which the first DC/DC converter 12 is operating is found, and it is determined whether or not Vb/Va is matches 1/n (Step 112). If, for example, the first DC/DC converter 12 is operating at a voltage conversion ratio of 1/2, it is determined whether or not Vb/Va is equal to 1/2. If the first DC/DC converter 12 is operating at a voltage conversion ratio of 1, it is determined whether or not Vb/Va is equal to 1.

Next, if Vb/Va is equal to 1/n at Step 112, the controlling circuit 17 deems that the first DC/DC converter 12 is operating normally, and returns to Step 111. If Vb/Va is not equal to 1/n at Step 112, the controlling circuit 17 deems that the first DC/DC converter 12 is not operating normally, proceeds to Step 113, and lights the warning lamp 21. Next, the controlling circuit 17 proceeds to Step 114, stops operation of the second DC/DC converter 13, and proceeds to Step 115. At Step 115, the regulator circuit 9 is controlled so as to set the field current that is passed to the field winding 4 to zero to stop electric power generation by the alternator 2, and the system protecting operation is terminated.

Moreover, the first DC/DC converter is controlled such that the voltage conversion ratio is 1/n, where n is an integer, but may deviate from an integral multiple due to voltage drops in the internal circuitry, and such voltage drops may be one to two volts, making the input voltage higher. Specifically, during 1/2 operation, the voltage conversion ratio may be in a range of 14/(28+2) to 14/(28+0), i.e., 0.933×(1/2) through 1×(1/2), and during 1/3 operation, may be in a range of 14/(42+2) through 14/(42+0), i.e., 0.955×(1/3) through 1×(1/3). Thus, an indicator of whether or not operation of the first DC/DC converter 12 at Step 112 is normal is set to 0.9×(1/n) through 1.0×(1/n) so as to allow for the above phenomenon. In other words, it is deemed that operation of the first DC/DC converter 12 is normal at Step 112 if 0.9×(1/n)≦(Vb/Va)≦1.0×(1/n).

Here, cases in which operation of the first DC/DC converter 12 is abnormal include not only cases in which the voltage conversion ratio is not at the set ratio of 1/n due to failure of the first DC/DC converter 12 itself, but also cases in which a portion of the alternator wiring 18a dislodges, for example, and electric current is unable to flow. Thus, if operation of the first DC/DC converter 12 is abnormal, the voltage Va at which the alternator 2 generates electric power may be a higher voltage that is unrelated to the 1/n ratio of the first DC/DC converter 12. If the voltage Va at which the alternator 2 generates electric power exceeds the voltage tolerance of the second DC/DC converter 13, breakdown of the second DC/DC converter 13 will occur.

According to Embodiment 10, the controlling circuit 17 determines whether or not operation of the first DC/DC converter 12 is normal based on voltage upstream and downstream from the first DC/DC converter 12, and lights the warning lamp 21 if it determines that operation of the first DC/DC converter 12 is abnormal. Thus, the driver can recognize an abnormality in the operation of the first DC/DC converter 12 by the warning lamp 21 being lit, stop the vehicle, and request repair, and breakdown of the second DC/DC converter 13 can also be prevented.

Because the controlling circuit 17 stops operation of the second DC/DC converter 13 and also stops electric power generation by the alternator 2 if it determines that operation of the first DC/DC converter 12 is abnormal, breakdown of the second DC/DC converter 13 can be reliably prevented.

Because the controlling circuit 17 determines whether or not operation of the first DC/DC converter 12 is normal based on the voltages Va and Vb upstream and downstream from the first DC/DC converter 12, abnormality in the operation of the first DC/DC converter 12 can be determined by a simple configuration.

In Embodiments 7 through 10 above, explanations using the automotive electric power supply system that is shown in FIG. 1 have been given, but the automotive electric power supply system that is shown in FIG. 2 may also be used.

In Embodiments 7 through 10 above, explanations using the first DC/DC converter 12, in which voltage conversion ratios are 1 and 1/2, are given, but it goes without saying that a first DC/DC converter in which voltage conversion ratios are 1, 1/2, and 1/3 may also be used.

Moreover, in each of the above embodiments, an automotive alternator is used as a generator, but the present invention is not limited to automotive alternators, and similar effects can also be achieved if applied to automotive generator-motors.

In each of the above embodiments, driving of the first and second electricity storage apparatuses and the regulator circuit of the alternator is explained as being controlled by a single controlling circuit, but the controlling circuit may also be configured so as to be divided into a controlling circuit that controls driving of the first and second electricity storage apparatuses, and a controlling circuit that controls driving of the regulator circuit of the alternator.

In each of the above embodiments, an electrical double-layer capacitor is used as the second electricity storage apparatus, but the second electricity storage apparatus is not limited to an electrical double-layer capacitor, and a lithium-ion capacitor, a lithium-ion battery, or a composite electric power supply that includes a lithium-ion battery and an electrical double-layer capacitor can be used, for example, provided that the second electricity storage apparatus has an electricity storage capacity that is smaller than the first electricity storage apparatus.

In each of the above embodiments, the rectifier is configured into a three-phase full-wave rectifying circuit that uses diode bridges, but the rectifier may also be constituted by a metal-oxide-semiconductor field-effect transistor (MOSFET) that performs synchronous rectification, or a polyphase inverter having MOSFETs that performs rectification using parasitic diodes.

In each of the above embodiments, the stator of the alternator uses a three-phase alternating-current winding, but the stator winding is not limited to a three-phase alternating-current winding, and may also be multiple three-phase alternating-current windings, or a polyphase alternating-current winding (five-phase, or seven-phase, for example). In that case, the rectifier rectifies the AC power into direct current using a full-wave rectifying circuit that has a corresponding number of phases.

The invention claimed is:

1. An automotive electric power supply system comprising:
   an alternator that is driven by an engine to generate alternating-current electric power;
   a rectifier that rectifies said alternating-current electric power that is generated by said alternator to output direct-current electric power;

a first DC/DC converter that is connected by alternator wiring to a higher-voltage output terminal of said rectifier, and that converts a voltage value of an output voltage of said rectifier to output a different direct-current voltage;

a first electricity storage apparatus that is connected by load wiring to said first DC/DC converter, and that supplies electric power to a load;

a second DC/DC converter that is connected by alternator wiring to a higher-voltage output terminal of said rectifier, and that converts a voltage value of an output voltage of said rectifier to output a different direct-current voltage;

a second electricity storage apparatus that has an electricity storage capacity that is less than said first electricity storage apparatus, and that is connected to said second DC/DC converter;

a regulator circuit that is connected to said alternator wiring or said load wiring, and that supplies a field current to a field winding of said alternator; and a controlling circuit that controls driving of said first DC/DC converter and said second DC/DC converter to store said output direct-current electric power from said rectifier in said first electricity storage apparatus and said second electricity storage apparatus, wherein said second DC/DC converter is constituted by a bidirectional DC/DC converter.

2. The automotive electric power supply system according to claim 1, wherein said automotive electric power supply system is configured to supply electricity by said second DC/DC converter from said second electricity storage apparatus to a large-capacity electrical load that has a large capacity compared to said load.

3. The automotive electric power supply system according to claim 1, wherein said controlling circuit is configured to perform feedback control over a charging and discharging electric current of said second electricity storage apparatus by said second DC/DC converter such that a voltage of said load wiring is at a first voltage value, and to perform feedback control over said field current that is passed through said alternator such that said voltage of said load wiring is at a second voltage value that is lower than said first voltage value during vehicle acceleration and constant-speed movement, and such that said voltage of said load wiring is at a third voltage value that is higher than said first voltage value during vehicle deceleration.

4. The automotive electric power supply system according to claim 1, wherein said controlling circuit sets said alternator to a non-generating state, and supplies electric power that is stored in said second electricity storage apparatus to said load responsive to said second electricity storage apparatus is in a non-overdischarged state during vehicle acceleration, and sets said alternator to a power generating state, and controls operation of said second DC/DC converter to supply said generated electric power from said alternator to said load and to charge said second electricity storage apparatus responsive to said second electricity storage apparatus is in a non-overcharged state during vehicle deceleration.

5. The automotive electric power supply system according to claim 1, further comprising a notifying means that gives notification that said second electricity storage apparatus is in an abnormal state, wherein said controlling circuit is configured to determine a state of said second electricity storage apparatus at commencement of discharging of said second electricity storage apparatus, and to operate said notifying means responsive to said second electricity storage apparatus is in said abnormal state to notify a driver that said second electricity storage apparatus is in said abnormal state.

6. The automotive electric power supply system according to claim 1, wherein said controlling circuit is configured to determine a state of said second electricity storage apparatus at commencement of discharging of said second electricity storage apparatus, and to stop a discharging operation of said second electricity storage apparatus responsive to said second electricity storage apparatus is in an abnormal state.

7. The automotive electric power supply system according to claim 1, further comprising a notifying means that gives notification of an abnormality in operation of said first DC/DC converter, wherein said controlling circuit is configured to determine whether or not operation of said first DC/DC converter is normal, and to operate said notifying means responsive to operation of said first DC/DC converter is abnormal to notify a driver of said abnormality in operation of said first DC/DC converter.

8. The automotive electric power supply system according to claim 1, wherein said controlling circuit is configured to determine whether or not operation of said first DC/DC converter is normal, and to stop operation of said second DC/DC converter and stop electric power generation by said alternator responsive to said operation of said first DC/DC converter is abnormal.

9. An automotive electric power supply system comprising:

an alternator that is driven by an engine to generate alternating-current electric power;

a rectifier that rectifies said alternating-current electric power that is generated by said alternator to output direct-current electric power;

a first DC/DC converter that is connected by alternator wiring to a higher-voltage output terminal of said rectifier, and that converts a voltage value of an output voltage of said rectifier to output a different direct-current voltage;

a first electricity storage apparatus that is connected by load wiring to said first DC/DC converter, and that supplies electric power to a load;

a second DC/DC converter that is connected by alternator wiring to a higher-voltage output terminal of said rectifier, and that converts a voltage value of an output voltage of said rectifier to output a different direct-current voltage;

a second electricity storage apparatus that has an electricity storage capacity that is less than said first electricity storage apparatus, and that is connected to said second DC/DC converter;

a regulator circuit that is connected to said alternator wiring or said load wiring, and that supplies a field current to a field winding of said alternator; and a controlling circuit that controls driving of said first DC/DC converter and said second DC/DC converter to store said output direct-current electric power from said rectifier in said first electricity storage apparatus and said second electricity storage apparatus, wherein either said first DC/DC converter or said second DC/DC converter has a voltage conversion ratio that is approximately 1/n, where n is an integer; and said controlling circuit controls driving of either said first DC/DC converter or said second DC/DC converter to modify n of said voltage conversion ratio.

10. The automotive electric power supply system according to claim 9, wherein said controlling circuit controls said regulator circuit to stop supply of electric power to said field winding to stop electric power generation by said alternator when n of said voltage conversion ratio of either said first DC/DC converter or said second DC/DC converter is changed.

11. The automotive electric power supply system according to claim 9, further comprising a rotation sensor that detects rotational speed of said engine or a rotor of said alternator,
   wherein said controlling circuit changes n of said voltage conversion ratio of either said first DC/DC converter or said second DC/DC converter in response to said rotational speed that is detected by said rotation sensor.

12. The automotive electric power supply system according to claim 9, wherein said automotive electric power supply system is configured to supply electricity by said second DC/DC converter from said second electricity storage apparatus to a large-capacity electrical load that has a large capacity compared to said load.

13. The automotive electric power supply system according to claim 9, wherein said controlling circuit is configured to perform feedback control over a charging and discharging electric current of said second electricity storage apparatus by said second DC/DC converter such that a voltage of said load wiring is at a first voltage value, and to perform feedback control over said field current that is passed through said alternator such that said voltage of said load wiring is at a second voltage value that is lower than said first voltage value during vehicle acceleration and constant-speed movement, and such that said voltage of said load wiring is at a third voltage value that is higher than said first voltage value during vehicle deceleration.

14. The automotive electric power supply system according to claim 9, wherein said controlling circuit sets said alternator to a non-generating state, and supplies electric power that is stored in said second electricity storage apparatus to said load responsive to said second electricity storage apparatus is in a non-overdischarged state during vehicle acceleration, and sets said alternator to a power generating state, and controls operation of said second DC/DC converter to supply said generated electric power from said alternator to said load and to charge said second electricity storage apparatus responsive to said second electricity storage apparatus is in a non-overcharged state during vehicle deceleration.

15. The automotive electric power supply system according to claim 9, further comprising a notifying means that gives notification that said second electricity storage apparatus is in an abnormal state,
   wherein said controlling circuit is configured to determine a state of said second electricity storage apparatus at commencement of discharging of said second electricity storage apparatus, and to operate said notifying means responsive to said second electricity storage apparatus is in said abnormal state to notify a driver that said second electricity storage apparatus is in said abnormal state.

16. The automotive electric power supply system according to claim 9, wherein said controlling circuit is configured to determine a state of said second electricity storage apparatus at commencement of discharging of said second electricity storage apparatus, and to stop a discharging operation of said second electricity storage apparatus responsive to said second electricity storage apparatus is in an abnormal state.

17. The automotive electric power supply system according to claim 9, further comprising a notifying means that gives notification of an abnormality in operation of said first DC/DC converter,
   wherein said controlling circuit is configured to determine whether or not operation of said first DC/DC converter is normal, and to operate said notifying means responsive to operation of said first DC/DC converter is abnormal to notify a driver of said abnormality in operation of said first DC/DC converter.

18. The automotive electric power supply system according to claim 9, wherein said controlling circuit is configured to determine whether or not operation of said first DC/DC converter is normal, and to stop operation of said second DC/DC converter and stop electric power generation by said alternator responsive to said operation of said first DC/DC converter is abnormal.

* * * * *